US012807872B2

(12) United States Patent
Ikehata et al.

(10) Patent No.: US 12,807,872 B2
(45) **Date of Patent: *Nov. 24, 2026**

(54) LIQUID CRYSTAL POLYESTER RESIN COMPOSITION, LIQUID CRYSTAL POLYESTER FIBERS, FIBER STRUCTURE AND MELT MOLDED BODY

(71) Applicant: KURARAY CO., LTD., Kurashiki (JP)

(72) Inventors: Keiichi Ikehata, Kurashiki (JP); Hideki Kamada, Kurashiki (JP); Hideharu Iwasaki, Osaka (JP); Kazuhisa Nakayama, Kurashiki (JP)

(73) Assignee: KURARAY CO., LTD., Kurashiki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/200,888

(22) Filed: May 23, 2023

(65) Prior Publication Data

US 2023/0323208 A1 Oct. 12, 2023

Related U.S. Application Data

(63) Continuation of application No. PCT/JP2021/041910, filed on Nov. 15, 2021.

(30) Foreign Application Priority Data

Nov. 25, 2020 (JP) ................................ 2020-195470
Nov. 25, 2020 (JP) ................................ 2020-195471

(51) Int. Cl.
*C09K 19/38* (2006.01)
*D01D 5/084* (2006.01)

(52) U.S. Cl.
CPC ......... *C09K 19/3838* (2013.01); *D01D 5/084* (2013.01); *C09K 2219/01* (2013.01); *D10B 2331/04* (2013.01)

(58) Field of Classification Search
CPC ...................................................... C09K 19/38
See application file for complete search history.

(56) References Cited

U.S. PATENT DOCUMENTS

| | | | | |
|---|---|---|---|---|
| 4,728,698 | A | 3/1988 | Isayev et al. | |
| 4,871,501 | A | 10/1989 | Sugimoto et al. | |
| 7,132,383 | B2 | 11/2006 | Nakajima et al. | |
| 9,873,835 | B2 | 1/2018 | Saito | |
| 2004/0058805 | A1 | 3/2004 | Nakajima et al. | |
| 2011/0318982 | A1 | 12/2011 | Funatsu et al. | |
| 2012/0021218 | A1* | 1/2012 | Lee | D06M 11/83 205/159 |
| 2013/0030143 | A1 | 1/2013 | Saito | |
| 2013/0131303 | A1 | 5/2013 | Hosoda et al. | |
| 2015/0004409 | A1 | 1/2015 | Sakae et al. | |
| 2023/0055144 | A1 | 2/2023 | Ikehata et al. | |

FOREIGN PATENT DOCUMENTS

| | | | | | |
|---|---|---|---|---|---|
| CN | 105801824 | A | | 7/2016 | |
| CN | 105860445 | A | | 8/2016 | |
| CN | 108026258 | A | | 5/2018 | |
| CN | 116601342 | A | | 8/2023 | |
| EP | 2420600 | B1 | | 5/2016 | |
| EP | 4092172 | | | 11/2022 | |
| JP | S61018567 | B2 | | 5/1986 | |
| JP | S61287922 | A | | 12/1986 | |
| JP | H01-280031 | A | | 11/1989 | |
| JP | H03260114 | A | | 11/1991 | |
| JP | H04-73227 | A | | 3/1992 | |
| JP | 05-085642 | B2 | | 12/1993 | |
| JP | H11293522 | A | | 10/1999 | |
| JP | 2004019021 | A | | 1/2004 | |
| JP | 2006089714 | A | | 4/2006 | |
| JP | 2011084611 | A | | 4/2011 | |
| JP | 2013067779 | A | | 4/2013 | |
| JP | 2013237945 | A | | 11/2013 | |
| JP | 2016125051 | A | | 7/2016 | |
| JP | 2016176161 | A | | 10/2016 | |
| JP | 2018040077 | A | | 3/2018 | |
| JP | 2018188742 | A | | 11/2018 | |
| JP | 2019006973 | A | | 1/2019 | |
| JP | 2020105397 | A | * | 7/2020 | |
| KR | 1020130132754 | A | | 12/2013 | |
| KR | 101988184 | B1 | | 6/2019 | |
| TW | 572932 | B | | 1/2004 | |
| TW | 200902782 | A | | 1/2009 | |
| TW | 201245522 | A1 | | 11/2012 | |
| TW | 201546340 | A | | 12/2015 | |
| WO | WO-0222707 | A1 | | 3/2002 | |
| WO | WO-2013099863 | A1 | | 7/2013 | |
| WO | WO-2017068867 | A1 | * | 4/2017 | C08G 63/60 |
| WO | WO-2017177921 | A1 | * | 10/2017 | C08G 63/60 |
| WO | WO-2020166316 | A1 | | 8/2020 | |
| WO | WO-2020175216 | A1 | | 9/2020 | |
| WO | WO-2020204124 | A1 | * | 10/2020 | |
| WO | WO-2020204125 | A1 | | 10/2020 | |

OTHER PUBLICATIONS

Machine Translation of WO 2017177921 A1 (Year: 2025).*
International Search Report issued Jan. 11, 2022 in PCT/JP2021/041910 (with English translation), 4 pages.
U.S. Appl. No. 18/200,678, filed May 23, 2023, Keiichi Ikehata.
English translation of the International Preliminary Report on Patentability and Written Opinion issued Jun. 8, 2023 in PCT/JP2021/041910, 6 pages.

(Continued)

*Primary Examiner* — Chanceity N Robinson
(74) *Attorney, Agent, or Firm* — Element IP, PLC

(57) ABSTRACT

A liquid crystal polyester resin composition and a liquid crystal polyester fiber both capable of suppressing gas generation during melt-heating as well as producing a molded body of good quality with few bubbles. The liquid crystal polyester resin composition includes a liquid crystal polyester and at least one metallic element selected from the group consisting of metallic elements belonging to from Group 8 to Group 11 in Periodic Table. The liquid crystal polyester fiber includes the liquid crystal polyester resin composition. For example, the liquid crystal polyester fiber may have a total amount of carboxy end groups (total CEG amount) of 5.0 mEq/kg or less.

20 Claims, No Drawings

(56) References Cited

OTHER PUBLICATIONS

K. Oba et al., "Characterization of abnormal structures in thermally treated liquid crystalline aromatic polyesters by pyrolysis-gas chromatography in the presence of organic alkali", Polymer Degradation and Stability, 76, 2002, pp. 85-94.
English translation of the International Preliminary Report on Patentability and Written Opinion issued Jun. 8, 2023, in PCT/JP2021/041909, 6 pages.
Extended European Search Report issued Nov. 4, 2024, in corresponding European Patent Application No. 21897777.5, 9 pages.
Extended European Search Report issued Oct. 23, 2024, in corresponding European Patent Application No. 21897776.7, 8 pages.
International Search Report issued Jan. 11, 2022, in PCT/JP2021/041909 (with English translation), 4 pages.
Office Action issued Sep. 29, 2025, in corresponding Chinese Patent Application No. 202180079435.8 (with English translation), 16 pages.
Polyester Production Technology Q&A, Lu Huibao et al., China Textile Industry Press, Jun. 1993, p. 57 (with AI Produced English Summary).
World Plastics Industry, Institute of Science and Technology Information, Ministry of Chemical Industry, Sep. 1980, p. 202 (with AI Produced English Summary).

* cited by examiner

LIQUID CRYSTAL POLYESTER RESIN COMPOSITION, LIQUID CRYSTAL POLYESTER FIBERS, FIBER STRUCTURE AND MELT MOLDED BODY

CROSS REFERENCE TO THE RELATED APPLICATIONS

This application is a continuation application, under 35 U.S.C. § 111(a) of international application No. PCT/JP2021/041910, filed Nov. 15, 2021, which claims priority to Japanese patent application Nos. 2020-195470 and 2020-195471, both filed Nov. 25, 2020, the entire disclosures of all of which are herein incorporated by reference as a part of this application.

FIELD OF THE INVENTION

The present invention relates to a liquid crystal polyester resin composition; to a fiber comprising such a liquid crystal polyester resin composition; and to a fiber structure containing such a fiber as a part thereof. The present invention further relates to a molded body obtained by melt-molding the liquid crystal polyester resin composition.

BACKGROUND ART

There has been conventionally known as an intermediate material used in a production of a fiber-reinforced composite material, composite fibers containing reinforcing fibers and thermoplastic fibers (in the case of intermediate materials for fiber-reinforced composites, thermoplastic fibers are sometimes hereinafter referred to as melt-fusible fibers because they are melt-fused in a subsequent process). For example, Patent Document 1 (JP Laid-open Patent Publication No. 1-280031), Patent Document 2 (JP Laid-open Patent Publication No. 2013-237945), and Patent Document 3 (JP Laid-open Patent Publication No. 4-73227) describe a blended yarn containing a continuous reinforcing fiber and a continuous thermoplastic fiber, as well as a composite fiber in which plasticized continuous thermoplastic fibers are bonded with continuous reinforcing fibers.

Such composite fibers containing continuous reinforcing fibers and continuous thermoplastic fibers are more flexible than prepregs (tape or fabric-like materials comprising reinforcing fiber tows or fabric coated or covered with a thermosetting resin), generally used as precursors for fiber-reinforced composite materials, or than intermediate materials comprising reinforcing fiber tows or fabric melt-impregnated with a thermoplastic resin. Such a composite fibers can be easily handled to form fabrics by weaving or knitting processes, in which the fabrics can be formed into various three-dimensional deformations, such as cylindrical or domed shapes. Therefore, the composite fibers can be effectively used as a raw material for sheet-shaped fiber-reinforced molded products which is formable into three-dimensional shapes, such as duct tubes and automobile bumpers. Considering that such molded products are applicable to many applications which generate vibrations, such as the duct tubes and automobile bumpers as described above, there is an expectation that liquid crystal polyester fibers made of liquid crystal polyester, a thermoplastic resin with excellent vibration damping properties, can be used to produce molded bodies with excellent vibration-damping properties by using the liquid crystal polyester fibers as reinforcement fibers as well as fusion-bonded fibers.

For example, as components of structure bodies such as bicycles, automobiles, railcars, and aircraft that require high impact resistance and reduced scattering of broken products along with breakage, there has been reported a molded body with both high impact resistance and vibration damping properties, by using liquid crystal polyester fibers as heat-fusible fibers and reinforcing carbon fibers.

For example, Patent Document 4 (JP Laid-open Patent Publication No. 2011-84611) discloses a wholly aromatic polyester resin molded body reinforced by high-strength fibers that are practically un-melted at a temperature of 400° C. or higher and have a breaking tenacity of 10 cN/dtex or higher. Specifically, liquid crystal polyester fibers, as a precursor for a matrix resin, are made in the form of a bi-directional woven fabric, then overlaid with a bi-directional woven fabric composed of carbon fibers as high-strength fibers, and heat-pressed under temperature conditions of 300 to 370° C. to produce a fiber-reinforced resin molded body.

RELATED ART DOCUMENT

Patent Document

[Patent Document 1] JP Laid-open Patent Publication No. 1-280031

[Patent Document 2] JP Laid-open Patent Publication No. 2013-237945

[Patent Document 3] JP Laid-open Patent Publication No. 4-73227

[Patent Document 4] JP Laid-open Patent Publication No. 2011-84611

SUMMARY OF THE INVENTION

However, in the case of manufacturing a fiber-reinforced composite is plastic using a liquid crystal polyester through a process that includes heating, the heating temperatures above 300° C. may generate bubbles in the molded body by thermal decomposition gas from the liquid crystal polyester at heating temperatures. Accordingly, there is a problem that the resulting fiber-reinforced liquid crystal polyester resin molded body have deteriorated physical properties and appearance.

An object of the present invention is to solve the above problems and to provide a liquid crystal polyester resin composition, which do not generate bubbles at the time of melt-heating so as to obtain a molded body of high quality, and a liquid crystal polyester fiber made from the resin composition.

The inventors of the present invention have conducted extensive studies in order to achieve the aforementioned object, and found that thermal decomposition gas from the liquid crystal polyester resin composition with heating at a predetermined temperature is triggered by decarboxylation reaction in a carboxy group where the carboxy group exists at an end of a liquid crystal polyester molecule. Then, the inventors further studied and found that a liquid crystal polyester resin composition containing a liquid crystal polyester and a specific metallic element(s) enables to decrease the amount of carboxy end groups therein during melt-kneading procedure, so as to decrease bubble generation in an obtained melt-molded body, leading to the completion of the present invention.

That is, the present invention may include the following aspects.

Aspect 1

A liquid crystal polyester resin composition comprising a liquid crystal polyester and at least one metallic element selected from the group consisting of metallic elements belonging to from Group 8 to Group 11 in Periodic Table (preferably at least one metallic element selected from the group consisting of copper, cobalt, and palladium).

Aspect 2

The liquid crystal polyester resin composition according to aspect 1, wherein a total content of the selected one or more metallic elements is from 1 to 1000 ppm by weight (preferably from 3 to 500 ppm by weight, more preferably from 5 to 200 ppm by weight, and still more preferably from 10 to 100 ppm by weight).

Aspect 3

The liquid crystal polyester resin composition according to aspect 1 or 2, wherein a total amount of carboxy end groups (total CEG amount) in the liquid crystal polyester is 5.0 mEq/kg or less (preferably 4.0 mEq/kg or less, more preferably 3.0 mEq/kg or less, further preferably 2.5 mEq/kg or less, and still more preferably 2.0 mEq/kg or less).

Aspect 4

The liquid crystal polyester resin composition according to any one of aspects 1 to 3, wherein a total amount of one-end groups in the liquid crystal polyester is 50 mEq/kg or more (preferably 55 mEq/kg or more, and more preferably 60 mEq/kg or more).

Aspect 5

The liquid crystal polyester resin composition according to any one of aspects 1 to 4, wherein the liquid crystal polyester resin composition has a melt-viscosity of 10 to 100 Pa·s (preferably 13 to 80 Pa·s, more preferably 15 to 50 Pa·s) measured at a shear rate of 1216 $sec^{-1}$ at a temperature of $(Mp_0+30)$° C., wherein the $Mp_0$ denotes a melting point of the liquid crystal polyester.

Aspect 6

The liquid crystal polyester resin composition according to any one of aspects 1 to 5, wherein the liquid crystal polyester comprises a structural unit derived from 4-hydroxybenzoic acid and a structural unit derived from 6-hydroxy-2-naphthoic acid; or comprises a structural unit derived from 4-hydroxybenzoic acid, a structural unit derived from an aromatic dicarboxylic acid and a structural unit derived from an aromatic diol.

Aspect 7

The liquid crystal polyester resin composition according to any one of aspects 1 to 6, wherein the liquid crystal polyester comprises a structural unit derived from 4-hydroxybenzoic acid at a proportion of 50 mol % or more (preferably 53 mol % or more, and more preferably 60 mol % or more).

Aspect 8

The liquid crystal polyester resin composition according to any one of aspects 1 to 7, wherein the selected one or more metallic elements are contained as one or more metallic compounds each having a melting point of $(Mp_0+30)$° C. or lower (preferably $Mp_0$+20° C. or lower), wherein the $Mp_0$ denotes a melting point of the liquid crystal polyester.

Aspect 9

The liquid crystal polyester resin composition according to aspect 8, wherein the one or more metallic compounds are at least one compound selected from the group consisting of organic acid salts, inorganic acid salts, halides, hydroxides and metal complex compounds.

Aspect 10

A liquid crystal polyester fiber comprising the liquid crystal polyester resin composition as recited in any one of aspects 1 to 9.

Aspect 11

The liquid crystal polyester fiber according to aspect 10, having a melting point of 380° C. or lower (preferably from 250 to 350° C., more preferably from 260 to 300° C.).

Aspect 12

The liquid crystal polyester fiber according to aspect 10 or 11, having a tenacity of lower than 18 cN/dtex (preferably 2 to 16 cN/dtex, and more preferably 6 to 12 cN/dtex).

Aspect 13

A method for producing the liquid crystal polyester fiber as recited in any one of aspects 10 to 12 at least comprising: melt-kneading the liquid crystal polyester resin composition as recited in any one of aspects 1 to 9 to obtain a melt-kneaded material, and spinning by discharging the melt-kneaded material from a spinneret.

Aspect 14

A fiber structure at least partially comprising the liquid crystal polyester fiber as recited in any one of aspects 10 to 12.

Aspect 15

The fiber structure according to aspect 14, further comprising a reinforcing fiber.

Aspect 16

A melt-molded body obtained from the liquid crystal polyester resin composition as recited in any one of aspects 1 to 9.

Aspect 17

A method for producing a melt-molded body comprising: melt-molding the liquid crystal polyester resin composition as recited in any one of aspects 1 to 9, or the fiber structure as recited in aspect 14 or 15 at a temperature of equal to or higher than a melting point of the liquid crystal polyester or the liquid crystal polyester fiber.

Any combination of at least two components disclosed in the claims and/or the specification and/or the drawings is included in the invention. In particular, any combination of two or more of the claims is included in the invention.

The liquid crystal polyester resin composition and the liquid crystal polyester fiber according to the present invention can suppress gas generation during melt-heating so as to contribute to production of a molded body of good quality with few bubbles.

DETAILED DESCRIPTION OF THE INVENTION

Liquid Crystal Polyester Resin Composition

Liquid crystal polyester contained in the liquid crystal polyester resin composition comprises repeating structural units originating from, for example, aromatic diols, aromatic dicarboxylic acids, aromatic hydroxycarboxylic acids, etc. As long as the effect of the present invention is not spoiled, the repeating structural units originating from aromatic diols, aromatic dicarboxylic acids, and aromatic hydroxycarboxylic acids are not limited to a specific chemical composition. The liquid crystal polyester may include the structural units originating from aromatic diamines, aromatic hydroxy amines, or aromatic aminocarboxylic acids in the range which does not spoil the effect of the present invention. For example, preferable structural units may include units shown in Table 1.

TABLE 1

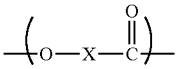,

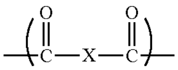,

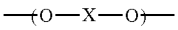,

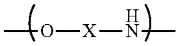

In the formula, X is selected from the following

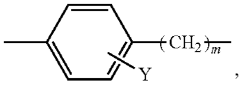,

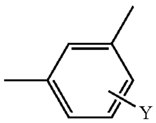,

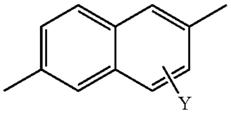,

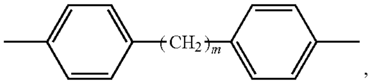,

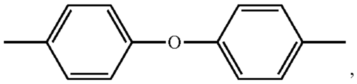,

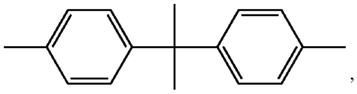,

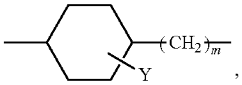,

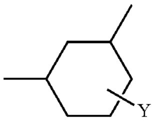

m is an integer from 0 to 2, Y is a substituent selected from hydrogen atom, halogen atoms, alkyl groups, aryl groups, aralkyl groups, alkoxy groups, aryloxy groups, aralkyloxy groups.

In the structural units in Table 1, m is an integer from 0 to 2, and Y in the formula independently represents, as from one substituent to the number of substituents in the range of the replaceable maximum number of aromatic ring, a hydrogen atom, a halogen atom (for example, fluorine atom, chlorine atom, bromine atom and iodine atom), an alkyl group (for example, an alkyl group having 1 to 4 carbon atoms such as methyl group, ethyl group, isopropyl group and t-butyl group), an alkoxy group (for example, methoxy group, ethoxy group, isopropoxy group, n-butoxy group, etc.), an aryl group (for example, phenyl group, naphthyl group, etc.), an aralkyl group [for example, benzyl group (phenylmethyl group), phenethyl group (phenylethyl group), etc.], an aryloxy group (for example, phenoxy group etc.), an aralkyloxy group (for example, benzyloxy group etc.), and others.

As more preferable structural units, there may be mentioned structural units as described in Examples (1) to (18) shown in the following Tables 2, 3, and 4. It should be noted that where the structural unit in the formula is a structural unit which can show a plurality of structures, combination of two or more units may be used as structural units for a polymer.

TABLE 2

(1)

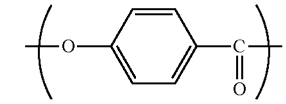,

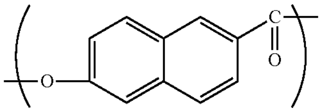

(2)

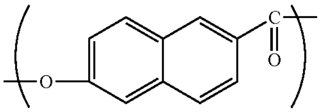,

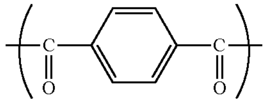,

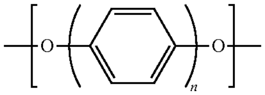

(3)

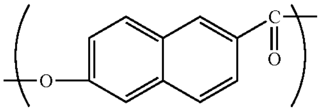,

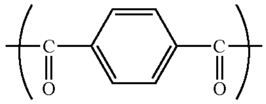,

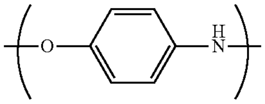

(4)

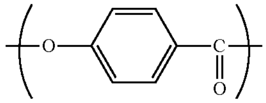,

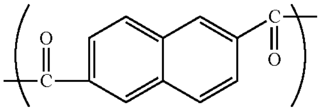,

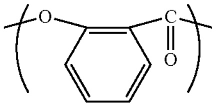,

TABLE 2-continued
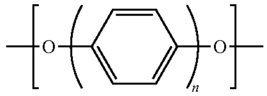
(5)
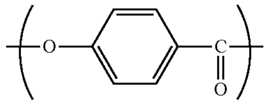
,
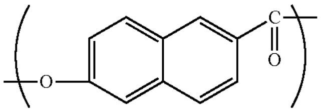
,
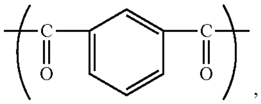
,
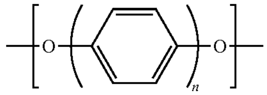
(6)
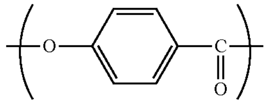
,
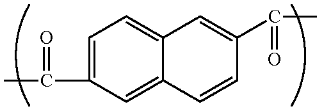
,
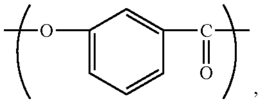
,
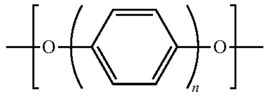
(7)
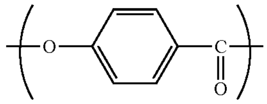
,
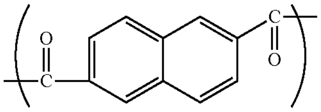
,
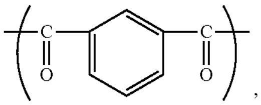
,
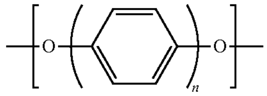
TABLE 2-continued
(8)
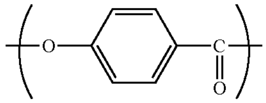
,
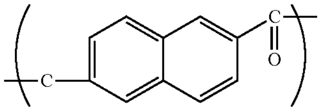
,
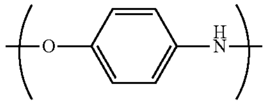
,
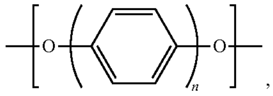
,
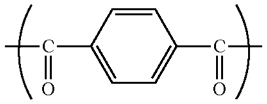
TABLE 3
(9)
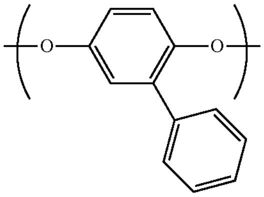
,
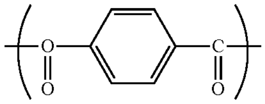
(10)
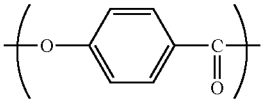
,
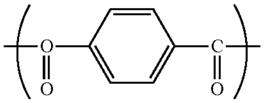
,
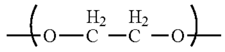
(11)
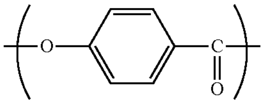
,
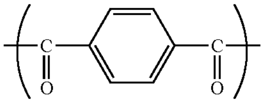
,
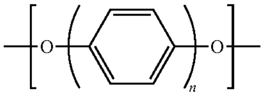
, TABLE 3-continued
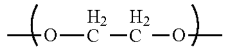
(12)
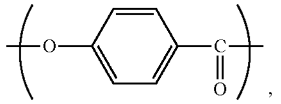
,
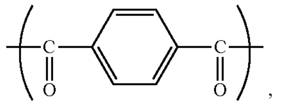
,
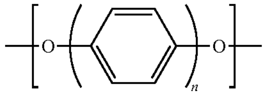
(13)
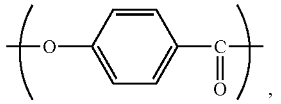
,
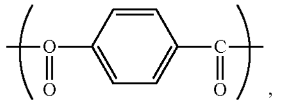
,
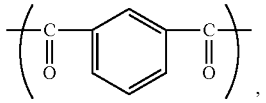
,
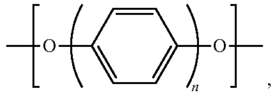
,
(14)
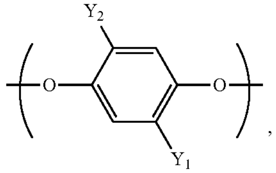
,
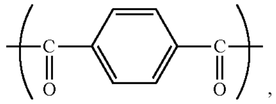
,
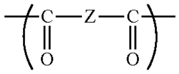
(15)
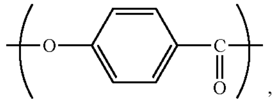
,
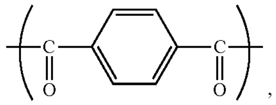
,
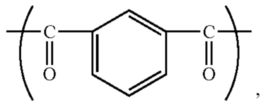
,
TABLE 3-continued
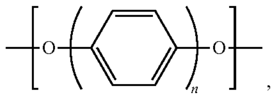
,
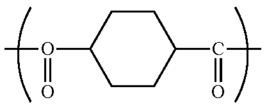
TABLE 4
(16)
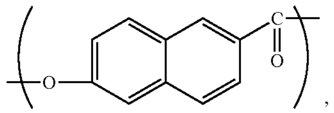
,
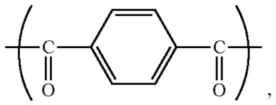
,
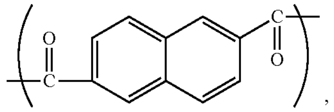
,
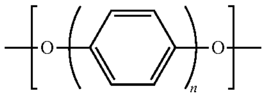
(17)
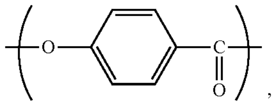
,
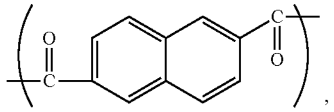
,
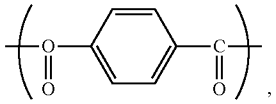
,
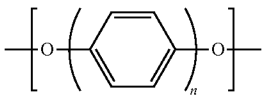
(18)
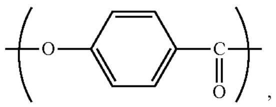
,
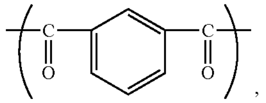
, TABLE 4-continued

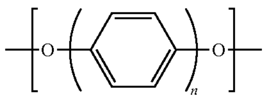

In the structural units shown in Tables 2, 3, and 4, n is an integer of 1 or 2, among each of the structural units, n=1 and n=2 may independently exist, or may exist in combination; each of the $Y_1$ and $Y_2$ independently represents, a hydrogen atom, a halogen atom (for example, fluorine atom, chlorine atom, bromine atom, iodine atom, etc.), an alkyl group (for example, an alkyl group having 1 to 4 carbon atoms such as methyl group, ethyl group, isopropyl group, and t-butyl group, etc.), an alkoxy group (for example, methoxy group, ethoxy group, and isopropoxy group, n-butoxy group, etc.), an aryl group (for example, phenyl group, naphthyl group, etc.), an aralkyl group [for example, benzyl group (phenylmethyl group), phenethyl group (phenylethyl group), etc.], an aryloxy group (for example, phenoxy group etc.), an aralkyloxy group (for example, benzyloxy group etc.), and others. Among these, the preferable one may include a hydrogen atom, a chlorine atom, a bromine atom, and a methyl group.

Z may include substitutional groups denoted by following formulae.

Chem. 1

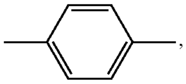,

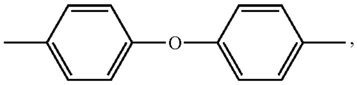,

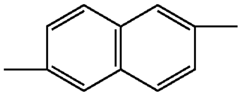,

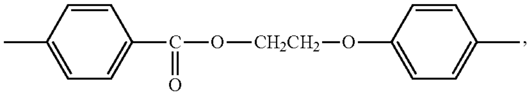,

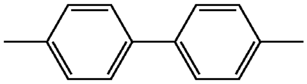

Preferable liquid crystal polyester may comprise a combination of a structural unit having a naphthalene skeleton. Especially preferable one may include both the structural unit (A) derived from hydroxybenzoic acid and the structural unit (B) derived from hydroxy naphthoic acid. For example, the structural unit (A) may have a following formula (A), and the structural unit (B) may have a following formula (B). In order to improve melt-formability, the ratio of the structural unit (A) and the structural unit (B) may preferably be in a range of former/latter of 9/1 to 1/1, more preferably from 7/1 to 1/1, and still more preferably from 5/1 to 1/1.

Chem. 2

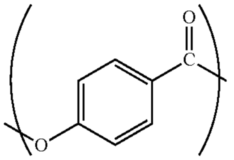

(A)

Chem. 3

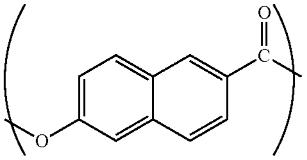

(B)

The total proportion of the structural units of (A) and (B) may be, based on all the structural units, for example, 65 mol % or more, more preferably 70 mol % or more, and further preferably 80 mol % or more. A liquid crystal polyester having the structural unit (13) at a proportion of 4 to 45 mol % is especially preferred among polymers.

The liquid crystal polyester may also contain a structural unit derived from 4-hydroxybenzoic acid as an aromatic hydroxycarboxylic acid, a structural unit derived from an aromatic dicarboxylic acid and a structural unit derived from an aromatic diol. For example, the structural unit derived from aromatic dicarboxylic acid may be at least one unit selected from the group consisting of the following formulae (C) and (D). The structural unit derived from aromatic diol may be at least one unit selected from the group consisting of the following formulae (E) and (F). Preferable one may include a liquid crystal polyester comprising a structural unit (A) derived from 4-hydroxybenzoic acid (formula (A) above), a structural unit (C) derived from terephthalic acid (formula (C) below) and a structural unit (D) derived from isophthalic acid (formula (D) below) as an aromatic dicarboxylic acid, and a structural unit (E) derived from 4,4'-dihydroxybiphenyl (formula (E) below) as an aromatic diol, and a liquid crystal polyester comprising a structural unit (A) derived from 4-hydroxybenzoic acid (formula (A) above), a structural unit (C) derived from terephthalic acid (formula (C) below) and a structural unit (D) derived from isophthalic acid (formula (D) below) as an aromatic dicarboxylic acid, and a structural unit (E) derived from 4,4'-dihydroxybiphenyl (formula (E) below) and a structural unit (F) derived from hydroquinone (formula (F) below) as an aromatic diol, and the like.

Chem. 4

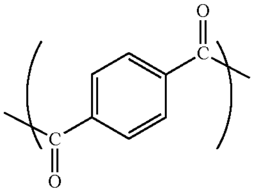

(C)

-continued

Chem. 5

(D)

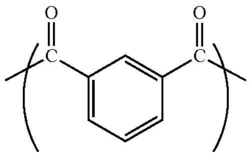

Chem. 6

(E)

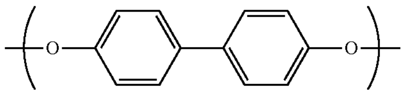

Chem. 7

(F)

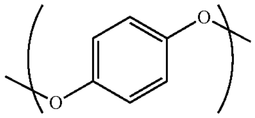

The liquid crystal polyester may contain a structural unit derived from 4-hydroxybenzoic acid, preferably at a proportion of 50 mol % or more, more preferably 53 mol % or more, and even more preferably 60 mol % or more. The upper limit of the content of the structural unit derived from 4-hydroxybenzoic acid in the liquid crystal polyester is not particularly limited, and may be, for example, 90 mol % or less, preferably 88 mol % or less, and more preferably 85 mol % or less.

The liquid crystal polyester suitably used in the present invention may preferably have a melting point (hereinafter sometimes referred to as $Mp_0$) in the range from 250 to 380° C., more preferably from 255 to 370° C., further preferably from 260 to 360° C., and even more preferably from 260 to 330° C. The melting point here refers to a main endothermic peak temperature determined and observed using a differential scanning calorimeter (DSC; "TA3000" produced by Mettler-Toledo International Inc.) in accordance with the JIS K 7121 test method. Specifically, 10 to 20 mg of a sample is encapsulated in an aluminum pan and taken into the aforementioned DSC device. Then the temperature is elevated at a rate of 20° C./min with supplying nitrogen as a carrier gas at a flow rate of 100 mL/min to measure an endothermic peak. Depending on the type of polymer, some polymers may not show a clear peak in the 1st run of DSC measurement. If no clear peak appears in the 1st run of DSC measurement, the sample is heated up to a temperature 50° C. higher than the expected flow temperature in a temperature elevation rate of 50° C./min. After keeping the temperature for 3 minutes so as to make the sample completely molten, the sample is cooled at a cooling rate of 80° C./min to 50° C., and then is elevated at 20° C./min to measure the endothermic peak thereof.

The liquid crystal polyester resin composition may contain the liquid crystal polyester at a proportion of 50 wt % or more, preferably 80 wt % or more, more preferably 90 wt % or more, further preferably 95 wt % or more, and even more preferably 99.9 wt % or more.

It should be noted that the liquid crystal polyester resin composition may be a resin composition containing other component(s) in a range which does not spoil the effect of the present invention, and may contain thermoplastic polymers, such as a polyethylene terephthalate, a modified-polyethylene terephthalate, a polyolefin, a polycarbonate, a polyamide, a polyphenylene sulfide, a polyether ether ketone, a fluoro-resin, and others. A variety of additives may also be added, including inorganic substances such as titanium oxide, kaolin, silica, and barium oxide; carbon black; a colorant such as dyes and paints; an antioxidant; an ultraviolet-ray absorbent; and a light stabilizer.

The liquid crystal polyester resin composition of the present invention contains at least one metallic element selected from the group consisting of metallic elements belonging to Group 8 to Group 11 in Periodic Table. The liquid crystal polyester resin composition of the present invention may preferably contain at least one metallic element selected from the group consisting of metallic elements belonging to Group 8 to Group 11 and Period 4 to Period 6 in Periodic Table. More concretely, the metallic element may be at least one metallic element selected from the group consisting of iron, ruthenium, osmium, cobalt, rhodium, iridium, nickel, palladium, platinum, copper, silver, and gold. Since the above-mentioned metallic elements act as a catalyst of the decarboxylation of aromatic carboxylic acid, the amount of carboxy groups at the terminal of liquid crystal polyester molecules can be declined by having carbon dioxide to be eliminated.

From the viewpoint of decreasing the total CEG amount by accelerating decarboxylation reaction of the aromatic carboxylic acid, the metallic element contained in the liquid crystal polyester resin composition of the present invention may be more preferably at least one metallic element selected from the group consisting of copper, cobalt, and palladium, and, still more preferably copper.

The above-mentioned metallic element may be contained as a metallic compound having a structure in which a metal atom is bonded with a non-metal atom. Examples of metallic compounds may include organic acid salts such as a formate, an acetate, a propionate, a butanoate, a valerate, a caproate, an enanthate, a caprylate, a pelargonate, a caprate, a laurate, a myristate, a palmitate, a stearate, a naphthenate, a benzoate, an oxalate, a malonate, a succinate, an adipate, a terephthalate, an isophthalate, a phthalate, a salicylate, a tartrate, a citrate, a fluoroacetate, a chloroacetate, a bromoacetate, a fluoropropionate, a chloropropionate, and a bromopropionate; inorganic acid salts such as a sulfate, a carbonate, and a nitrate; halides such as a fluoride, a chloride, a bromide, and an iodide; hydroxides; oxides; sulfides; and others. These metallic compounds may be used singly, or in combination of two or more. Among these metallic compounds, from the viewpoint of having a melting point and improved dispersibility into a melt-molded body, preferable metallic compounds may include, for example, organic acid salts, inorganic acid salts, halides, and hydroxides.

As long as the metallic compound can act as a catalyst for decarboxylation reaction of the aromatic carboxylic acid, the species of the metallic compound is not specifically limited, and the metallic compound may be a metal complex compound in which a metal atom makes a coordinate bond with a ligand. As long as the ligand is capable of coordinating to a metal atom in the metallic compound, the species of the ligand is not specifically limited, and examples of the ligands may include a nitrogen-based ligand, an oxygen-based ligand, a carbon-based ligand, a phosphorus-based ligand, a sulfur-based ligand, and other ligands. In the metallic compound, the metal atom may make a coordinate bond to a ligand such as an organic acid corresponding to the organic acid salt, an inorganic acid corresponding to the inorganic acid salt, and a halogen corresponding to the halide.

As long as the nitrogen-based ligand is a ligand with a nitrogen atom capable of coordinating to the metal atom in the metallic compound, the species of the nitrogen-based ligand is not specifically limited, and examples of the nitrogen-based ligands may include amine-based ligands such as ammine ($NH_3$), aniline, diisopropylamine, triethylamine, triphenylamine, hexamethyldisilazane, diazabicycloundecene, ethylenediamine (en), 2,3-butanediamine, N,N,N',N'-tetramethylethylenediamine, ethylenediaminetetraacetic acid (edta), diethylenetriamine, N,N,N,N",N"-pentamethyldiethylenetriamine, 1,4,7-triazacyclononane, triethylenetetramine, tris(2-aminoethyl)amine, and hexamethylenetetramine; nitrogen-containing heteroaromatic ligands such as pyrrole, pyridine (py), dimethylpyridine, bipyridine (bpy), terpyridine, imidazole, pyrazole, pyrazine, pyrimidine, triazole, quinoline, isoquinoline, acridine, 1,8-naphthyridine, phenanthroline (phen), 2,9-dimethyl-1,10-phenanthroline, 4,7-diphenyl-1,10-phenanthroline, 2,9-diphenyl-1,10-phenanthroline, 2,9-dimethyl-4,7-diphenyl-1,10-phenanthroline, dimethylaminopyridine, and porphyrin; nitrite-based ligands such as acetonitrile and benzonitrile; cyanide ($CN^-$); isothiocyanide (NCS—); nitrosyl (NO); and other ligands.

As long as the oxygen-based ligand is a ligand with an oxygen atom capable of coordinating to the metal atom in the metallic compound, the species of the oxygen-based ligand is not specifically limited, and examples of the oxygen-based ligands may include ether-based ligands such as dimethyl ether, diethyl ether, tetrahydrofuran, 1,4-dioxane, and 1,2-dimethoxyethane; alcohol-based ligands such as methanol, ethanol, phenol, and 1,1'-binaphthalene-2,2'-diol; acyl-based ligands such as carboxylato ($RCOO^-$), oxalato ($ox^{2-}$), and acetylacetonate (acac); aqua ($H_2O$); hydroxide ($OH^-$); oxo ($O^{2-}$); and other ligands.

As long as the carbon-based ligand is a ligand with a carbon atom capable of coordinating to the metal atom in the metallic compound, the species of the carbon-based ligand is not specifically limited, and examples of the carbon-based ligands may include alkyl-based ligands such as methyl; aryl-based ligands such as phenyl; vinyl-based ligands; alkynyl-based ligands; carbene-based ligands such as N-heterocyclic carbene; alkene-based ligands such as ethylene, dibenzylideneacetone (dba); alkyne-based ligands such as acetylene and 2-phenylethynylbenzene; cyclopentadiene-based ligands such as cyclopentadiene and pentamethylcyclopentadiene; diene-based ligands such as 1,3-butadiene and 1,5-cyclooctadiene (cod); cyclic polyene-based ligands such as benzene and cyclooctatetraene; isocyanide-based ligands such as eyanomethyl isocyanide and phenyl isocyanide; carbonyl (CO); and other ligands.

As long as the phosphorus-based ligand is a ligand with a phosphorus atom capable of coordinating to the metal atom in the metallic compound, the species of the phosphorus-based ligand is not specifically limited, and examples of the phosphorus-based ligands may include phosphine-based ligands such as triphenylphosphine, tris(2-methylphenyl)phosphine, tris(2-methoxyphenyl)phosphine, di-tert-butylphenylphosphine, trimethylphosphine, tri-tert-butylphosphine, tricyclohexylphosphine, bis(diphenylphosphino)methane (dppm), 1,2-bis(diphenylphosphino)ethane (dppe), 1,3-bis(diphenylphosphino)propane (dppp), 2,2'-bis(diphenylphosphino)-1,1'-binaphthyl (BINAP), 2-dicyclohexylphosphino-2',6'-dimethoxybiphenyl (SPhos), 2-dicyclohexylphosphino-2',4',6'-triisopropylbiphenyl (XPhos), 2-dicyclohexylphosphino-2'-methylbiphenyl (MePhos), 2-dicyclohexylphosphino-2'-(N,N-dimethylamino)biphenyl (DavePhos), and 2-(di-tert-butylphosphino)biphenyl (JohnPhos); and other ligands.

As long as the sulfur-based ligand is a ligand with a sulfur atom capable of coordinating to the metal atom in the metallic compound, the species of the sulfur-based ligand is not specifically limited, and examples of the sulfur-based ligands may include thiol-based ligands; sulfoxide-based ligands such as dimethyl sulfoxide (DMSO); sulfur-containing heteroaromatic ligands such as thiophene, dibenzothiophene, and thiopyran; thiocyanide ($SCN^-$); sulfide ($S^{2-}$); and other ligands.

Although a desirable ligand varies depending on a species of metal atom, in the case of copper, from the viewpoint of the acceleration of decarboxylation reaction of the aromatic carboxylic acid, a copper atom may be preferably coordinated with a nitrogen-based ligand, more preferably with a nitrogen-containing heteroaromatic ligand or nitrogen-based chelate ligand, and still more preferably with a nitrogen-containing heteroaromatic chelate ligand. Here, the chelate ligand is a ligand which is bidentate or more multidentate and has a plurality of coordination sites in a molecule, and is in a position where a plurality of coordination sites of the ligand can coordinate to one metal atom at one time. Examples of the nitrogen-based chelate ligands may include ethylenediamine, diethylenetriamine, triethylenetetramine, tris(2-aminoethyl)amine, hexamethy lenetetramine, bipyridine, terpyridine, phenanthroline, and derivatives thereof.

The valence of copper in a copper compound may be any of zerovalency, monovalency and divalency, and from the viewpoint of suppressing the condensation and localization during melt-spinning, the valence of copper may be preferably monovalent or divalent. From the viewpoint of the acceleration of decarboxylation reaction of the aromatic carboxylic acid, the valence of copper may be more preferably monovalent.

In the case of cobalt, from the viewpoint of the stability under the atmosphere at the time of use and the acceleration of decarboxylation reaction of the aromatic carboxylic acid, a cobalt atom may be preferably coordinated with an oxygen-based ligand, and more preferably with an acyl-based ligand.

In the case of palladium, from the viewpoint of the stability under the atmosphere at the time of use and the acceleration of decarboxylation reaction of the aromatic carboxylic acid, a palladium atom may be preferably coordinated with an oxygen-based ligand, and more preferably with an acyl-based ligand (e.g., carboxylato (preferably acetato and trifluoroacetato)).

In the liquid crystal polyester resin composition, for example, from the viewpoint of achieving both acceleration of decarboxylation reaction of the aromatic carboxylic acids and control of side reaction, the liquid crystal polyester resin composition may contain the above-mentioned metallic element at a total content of from 1 to 1000 ppm by weight, preferably from 3 to 500 ppm by weight, more preferably from 5 to 200 ppm by weight, and still more preferably from 10 to 100 ppm by weight. The content of the metallic element indicates a ratio of the total weight of the above-mentioned metallic elements based on the total weight of liquid crystal polyester resin composition. Where a metallic element(s) is(are) contained as the above-mentioned metallic compound(s), the content of the metallic element indicates a value converted as a content of metal atom. Here, the above-mentioned content of the metallic element may be a content of a metallic element in the component constituting the resin composition itself, excluding a component, such as a coating agent, adhering to surfaces of the resin composition (for example, a molded body).

Although the liquid crystal polyester resin composition of the present invention may contain a polymerization catalyst (for example, an alkaline metal and an alkaline-earth metal) which acts to polycondensation reaction of the liquid crystal polyester, from the viewpoint of control of side reactions, the liquid crystal polyester resin composition of the present invention may have a content of an alkaline metal and an alkaline-earth metal in total of less than 100 ppm by weight, preferably 10 ppm by weight or less, more preferably 5 ppm by weight or less, and still more preferably 1 ppm by weight or less. In the present specification, the alkaline metal indicates either one of lithium, sodium, potassium, rubidium, cesium, and francium, and the alkaline-earth metal indicates either one of beryllium, magnesium, calcium, strontium, barium, and radium.

Where the metallic compound is contained as a metal complex compound, as a configuration to be added to the liquid crystal polyester resin composition, the resin composition may contain a metal complex compound in the state where a ligand is already coordinated. Alternatively, the resin composition may contain a metallic compound and a compound being capable of forming a ligand which are separately added to the resin composition.

From the viewpoint of improvement in dispersibility at the time of melt-molding, the metallic compound may be a compound having a melting point of $(Mp_0+30)$° C. or lower, wherein the $Mp_0$ denotes a melting point of the liquid crystal polyester. In order to melt-mold the liquid crystal polyester resin composition, the resin composition is heated to be melted at a temperature of the melting point ($Mp_0$) of the liquid crystal polyester or higher. At this time, it is preferred to melt both the metallic compound and the liquid crystal polyester in the resin composition so as to accelerate decarboxylation reaction. The melting point of the metallic compound may be preferably $Mp_0+20$° C. or lower.

The melting point of the metallic compound may be preferably 400° C. or lower, and more preferably 350° C. or lower from the viewpoint of processability. Although the lower limit of the melting point of the metallic compound is not particularly limited, the lower limit may be preferably 100° C. or higher considering handleability in the melt molding.

The liquid crystal polyester resin composition may have a melt-viscosity of 10 to 100 Pa·s, preferably 13 to 80 Pa·s, more preferably 15 to 50 Pa·s, as measured by the method described in the Examples below, Although it is possible to reduce the amount of end groups to some extent by increasing the degree of polymerization through melt polymerization or solid phase polymerization, the higher the degree of polymerization, the higher the viscosity at the time of melting. As a result, such a polymerized material has difficulty in melt molding. Therefore, the liquid crystal polyester resin composition may have a melt-viscosity in a range favorable for melt molding.

In the liquid crystal polyester resin composition according to the present invention, the liquid crystal polyester may have a total amount of carboxy end groups (total CEG amount) of 5.0 mEq/kg or less. The total CEG amount in the liquid crystal polyester resin composition is a value measured by the method described in the Examples below, and is defined as the amount of carboxy end groups of the liquid crystal polyester molecules in 1 kg of the liquid crystal polyester resin composition. For example, as the carboxy end groups in liquid crystal polyester, there may be exemplified carboxy groups that do not participate in reaction and remain in the terminal structural units derived from monomers having carboxy groups, such as aromatic hydroxycarboxylic acids and aromatic dicarboxylic acids.

From the viewpoint of suppressing gas generation at the time of heat-molten state, the liquid crystal polyester in the liquid crystal polyester resin composition may have a total CEG amount of preferably 4.0 mEq/kg or less, more preferably 3.0 mEq/kg or less, further preferably 2.5 mEq/kg or less, and still more preferably 2.0 mEq/kg or less. The lower limit of the total CEG amount is not limited to a specific value, and it may be 0.1 mEq/kg or more.

From the viewpoint of suppressing gas generation during heating, the liquid crystal polyester in the liquid crystal polyester resin composition according to the present invention may contain carboxy end groups as carboxyphenyl (-Ph-COOH; Ph (phenyl group) may contain other substituents than COOH) terminal at a CEG amount of 4.0 mEq/kg or less, preferably 2.5 mEq/kg or less, more preferably 2.0 mEq/kg or less, and further preferably 1.5 mEq/kg or less. The carboxy group as the carboxyphenyl terminal may be derived from a monomer having a carboxyphenyl group, such as 4-hydroxybenzoic acid, terephthalic acid, isophthalic acid, etc. (in which a phenyl group of the carboxyphenyl group may optionally have a substituent such as a halogen atom, an alkyl group, an alkoxy group, an aryl group, an aralkyl group, an aryloxy group, an aralkyloxy group, etc.). The carboxy group as the carboxyphenyl terminal is a chemical structure especially vulnerable to decarboxylation reaction, so that it is preferable to reduce the CEG amount of the carboxy groups as the carboxyphenyl terminal. The lower limit of the CEG amount of the carboxy group as the carboxyphenyl terminal is not particularly limited, and may be, for example, 0.1 mEq/kg or more.

From the viewpoint of suppressing gas generation during heating, the liquid crystal polyester in the liquid crystal polyester resin composition according to the present invention may have a ratio of the CEG amount of the carboxy group as the carboxyphenyl terminal based on the total CEG amount of 90% or less, preferably 85% or less, and more preferably 80% or less. The lower limit of the ratio of the CEG amount of the carboxy group as the carboxyphenyl terminal based on the total CEG amount is not particularly limited, and may be, for example, 5% or more.

The liquid crystal polyester in the liquid crystal polyester resin composition according to the present invention may have a total amount of one-end groups of 50 mEq/kg or more, preferably 55 mEq/kg or more, and more preferably 60 mEq/kg or more. The total amount of one-end groups may be 200 mEq/kg or lower, and preferably 100 mEq/kg or lower. The term “total amount of one-end groups” indicates the number of polymer chains, and is used as an index by which a molecular weight is evaluated. There is a tendency that the larger the total amount of one-end groups is, the smaller the molecular weight is; while the smaller the total amount of one-end groups is, the larger the molecular weight is. Considering difficulty to quantify all kinds of end groups constituting the liquid crystal polyester depending on the monomer constitution of the liquid crystal polyester, the present invention defines that the total amount of one-end groups is a value obtained by dividing a total amount (mEq/kg) of end groups by a molar ratio of structural units derived from the hydroxycarboxylic acids in the liquid crystal polyester, in which the total amount (mEq/kg) of end groups is a value of (i) carboxy end groups derived from hydroxycarboxylic acids and (ii) end groups from which carbon dioxide was eliminated by decarboxylation reaction from carboxy groups derived from hydroxycarboxylic acids in 1 kg of the liquid crystal polyester resin composition. The total amount of one-end groups can be measured by the method described in the Examples below.

The liquid crystal polyester resin composition according to the present invention may have an amount of $CO_2$ gas generation, as measured by the method described in the Examples below, of 2.0 mmol/kg or less, preferably 1.5 mmol/kg or less, and more preferably 1.0 mmol/kg or less.

The liquid crystal polyester resin composition may be produced by polycondensation of various monomers in the presence of a specific metallic element(s), or may be produced by adding a specific metallic element(s) to a liquid crystal polyester obtained by polycondensation of various monomers. It should be noted that the specific metallic element(s) added in the early or middle stages of polycondensation may proceed decarboxylation reaction to inhibit ester bond formation, resulting in insufficient increase in the degree of polymerization. Therefore, it is preferable to add the specific metallic element(s) to the already polycondensated liquid crystal polyester to act as a catalyst for the decarboxylation reaction.

The liquid crystal polyester in the liquid crystal polyester resin composition according to the present invention is preferably a purified liquid crystal polyester. Where the liquid crystal polyester resin composition still containing monomers, acylating agents, etc. after polycondensation is directly melt-molded, there is a possibility that selective control between polycondensation reaction and decarboxylation reaction may be affected due to the influence of residual monomers, acylating agents, etc. Therefore, from the viewpoint of controlling the degree of polymerization for melt-moldability, it is preferable to purify the liquid crystal polyester obtained by polycondensation beforehand so as to remove the remaining monomers, etc., and melt-molding the purified liquid crystal polyester resin composition.

Liquid crystal polyesters can be synthesized by known polycondensation methods. Examples of monomers for polycondensation may include various aromatic diols, aromatic dicarboxylic acids, and aromatic hydroxycarboxylic acids, and hydroxy group acylates and carboxylic acid derivatives such as carboxyl group esters, acid halides, and acid anhydrides by activating the end thereof.

Polycondensation may be performed in the presence of various polymerization catalysts, for example, organotin-based catalysts (e.g., dialkyltin oxide), antimony-based catalysts (e.g., antimony trioxide), titanium-based catalysts (e.g., titanium dioxide), alkali metal salts or alkaline earth metal salts of carboxylic acids (e.g., potassium acetate), Lewis acids (e.g., $BF_3$), and other catalysts.

According to the present invention, melt-kneading procedure of a resin composition containing a liquid crystal polyester obtained by polycondensation of various monomers and a specific metallic element(s) acting as a catalyst for the decarboxylation reaction can proceed the decarboxylation reaction caused at aromatic carboxylic acid terminals in the liquid crystal polyester molecules so as to reduce the total CEG amount of the liquid crystal polyester. For example, by melt-kneading the resin composition in the melt extruder during the melt molding process, it is possible to obtain a molded body with fewer bubbles because of removal of carbon dioxide generated by the decarboxylation reaction before the molding process.

The liquid crystal polyester resin composition according to the present invention may be produced by a method which comprises: melt-kneading a mixture of a liquid crystal polyester obtained by polycondensation of various monomers and at least one metallic element selected from the group consisting of metallic elements of Groups 8 to 11 in Periodic Table. By melt-kneading the liquid crystal polyester and the specific metallic element in advance, the total CEG amount of the liquid crystal polyester can be lowered to the above-mentioned range. The liquid crystal polyester resin composition containing the liquid crystal polyester having the specific total CEG amount may be used for melt molding.

Since the above metallic elements in the resin composition act as catalysts for decarboxylation reaction, the resin composition comprising a specific metallic element(s) and a liquid crystal polyester obtained by polycondensation of various monomers can lower the temperature at which the decarboxylation reaction proceeds, thereby reducing the total CEG amount of the liquid crystal polyester even being subjected to normal melt-kneading temperatures. More concretely, the melt-kneading temperature in the melt-kneading process can be any temperature at which melt-kneading of the resin composition is possible. For example, the temperature may be the melting point ($Mp_0$) of the liquid crystal polyester or higher, preferably $Mp_0$+10° C. or higher, and more preferably $Mp_0$+20° C. or higher. The melt kneading temperature may be 280° C. or higher, preferably 290° C. or higher, more preferably 300° C. or higher. The melt-kneading temperature may be below the decomposition temperature of the liquid crystal polyester. It should be noted that the metallic elements in the liquid crystal polyester resin composition may be added in the amount, type, and configuration as described above.

The decarboxylation reaction in the polymer terminals is a reaction that substantially proceeds at the temperature as described above, i.e., the normal melt-kneading temperature or higher (e.g., the melting point of the liquid crystal polyester or higher). Liquid crystal polyesters, however, generally have higher heat resistance and flame resistance than polyesters that do not exhibit thermotropic liquid crystallinity (e.g., polyethylene terephthalate), so that the liquid crystal polyesters can be melt-kneaded at such a high temperature with efficiently proceeding decarboxylation reaction without causing resin degradation such as discoloration or main chain decomposition.

Melt-kneading can be performed by known methods, for example, using known resin kneading machines such as banbury mixers, mixing rollers, kneaders, single-screw extruders, and multi-screw extruders (twin- or more-screw extruders).

In the melt-kneading process, for example, when an extruder is used as a resin kneading machine, the melt-kneading period as a time for the resin to pass through the extruder (residence time in the extruder) is not limited to a specific time as long as the dispersion of additives and progress of the decarboxylation reaction are sufficiently advanced. The melt-kneading period may be, for example, from 30 seconds to 30 minutes, preferably from 1 minute to 10 minutes, and even more preferably from 3 minutes to 8 minutes.

From the viewpoint of removing carbon dioxide generated by the decarboxylation reaction out of the system and further accelerating the decarboxylation reaction, it is preferable to carry out degassing by reducing the pressure in the kneading machine. For example, degree of vacuum in absolute pressure may be 100 kPa or less, preferably 80 kPa or less, and more preferably 60 kPa or less.

After melt-kneading, the resin composition may be processed into a known shape such as pellets, chips, flakes, powder, or other shapes as used in melt molding. Alternatively, after melt-kneading, the resin composition may be molded directly into a desired shape to produce a melt-molded body as described below.

[Melt-Molded Body]

The liquid crystal polyester resin composition can be processed into a molded body with few air bubbles by known melt molding methods such as injection molding, injection compression molding, compression molding, extrusion molding, blow molding, press molding, and spinning. In the present invention, melt-molded bodies include molded bodies with three-dimensional shapes, sheets, films, fibers, and various other shapes.

The melt-molded body according to the present invention may be a fiber-reinforced molded body (fiber-reinforced composite material) containing reinforcing fibers. The type of reinforcing fiber is not limited as long as the reinforcing fiber has a melting point higher than that of the liquid crystal polyester according to the invention. Examples of reinforcing fibers may include at least one selected from the group consisting of glass fibers, carbon fibers, liquid crystal polyester fibers, aramid fibers, polyparaphenylenebenzobisoxazole fibers, polyparaphenylenebenzobisimidazole fibers, polyparaphenylenebenzobisthiazolc fibers, ceramic fibers, and metal fibers. These reinforcing fibers may be used singly or in combination of two or more.

Since the liquid crystal polyester constituting a matrix of the melt-molded body has excellent vibration damping properties, the resulting molded body has excellent vibration damping properties and can be effectively used in applications where vibration occurs, such as duct tubes and automobile bumpers.

Films and fibers can also be used as intermediate materials for further melt-molding so as to produce a melt-molded body in a three-dimensional shape or a sheet.

Method for Producing Liquid Crystal Polyester Fiber

A method for producing a liquid crystal polyester fiber may at least comprise: melt-kneading a liquid crystal polyester resin composition comprising a liquid crystal polyester and at least one metallic element selected from the group consisting of metallic elements belonging to from Group 8 to Group 11 in Periodic Table in an extruder to obtain a melt-kneaded material, and spinning by discharging the melt-kneaded material from a spinneret.

Since the extruder can maintain the material in the melt-kneaded state for a certain time before being fed to the spinning head, the material has an ensured time for reaction. Therefore, according to the present invention, melt-kneading procedure of the material including a specific metallic element(s) acting as a catalyst for the decarboxylation reaction at the aromatic carboxylic acid ends of the liquid crystal polyester in the extruder makes it possible to lower the total CEG amount of the resulting liquid crystal polyester fiber.

According to the present invention, melt-kneading procedure of the resin composition including a specific metallic element enables to accelerate the decarboxylation reaction by the catalytic action of the metallic element so as to control molecular terminals of the liquid crystal polyester. More concretely, the above-mentioned liquid crystal polyester resin composition comprising a liquid crystal polyester and at least one metallic element selected from the group consisting of metallic elements in Groups 8 to 11 in Periodic Table may be melt-kneaded in an extruder.

In the melt kneading process, the liquid crystal polyester resin composition need only contain a liquid crystal polyester and at least one metallic element selected from the group consisting of metallic elements in Groups 8 to 11 in Periodic Table, and the metallic element may be in the content, type and configuration as described above. For example, the metallic element may be contained as a metal compound as described above, and the metal compound may be a metal complex compound as described above from the viewpoint of accelerating the decarboxylation reaction. The metal compound may have a melting point described above from the viewpoint of enhancing dispersibility in the resin composition as well as improving continuous operation of melt spinning.

Since the metallic elements in the liquid crystal polyester resin composition act as a catalyst for the decarboxylation reaction, the metallic element enables a temperature required for the decarboxylation reaction to be lowered. Accordingly, the total CEG amount of the liquid crystal polyester fiber can be reduced even at the normal kneading temperature. More concretely, the kneading temperature in the extruder in the melt kneading process can be adjusted to the extent that the liquid crystal polyester resin composition has a viscosity suitable for spinning, and may be, for example, the melting point ($Mp_0$) of the liquid crystal polyester or higher, preferably $Mp_0$+10° C. or higher, and more preferably $Mp_0$+20° C. or higher. The kneading temperature in the extruder may be 280° C. or higher, preferably 290° C. or higher, and more preferably 300° C. or higher. The kneading temperature in the extruder may be less than the decomposition temperature of the liquid crystal polyester.

In the melt-kneading process, the melt-kneading period as a time for the resin to pass through the extruder (residence time in the extruder) is not limited to a specific time as long as the dispersion of additives and progress of the decarboxylation reaction are sufficiently advanced. The melt-kneading period may be, for example, from 30 seconds to 30 minutes, preferably from 1 minute to 10 minutes, and even more preferably from 3 minutes to 8 minutes.

Examples of the extruder may contain single-screw extruders, and multi-screw extruders (two- or more-screw extruders).

From the viewpoint of removing carbon dioxide produced by the decarboxylation reaction out of the system and further accelerating the decarboxylation reaction, it is preferable to carry out degassing by reducing the pressure in the extruder. For example, degree of vacuum in absolute pressure may be 100 kPa or less, preferably 80 kPa or less, and more preferably 60 kPa or less.

After obtaining a melt-kneaded material containing the liquid crystal polyester with reduced total CEG amount by advancing the decarboxylation reaction, the material may be fed to a spinning head and discharged from a spinneret for melt spinning. Melt-spinning may be carried out by a known or common method such that the resin can be discharged from a spinneret at a predetermined spinning temperature, and wound by a godet roller or the like.

Liquid Crystal Polyester Fiber

The liquid crystal polyester fiber comprises at least one metallic element selected from the group consisting of metallic elements belonging to from Group 8 to Group 11 in Periodic Table. As described above, by melt-spinning a liquid crystal polyester resin composition containing a specific metallic element(s), it is possible to accelerate the decarboxylation reaction at the molecular terminals of the liquid crystal polyester so as to reduce the total CEG amount of the resulting liquid crystal polyester fiber.

The metallic elements in the liquid crystal polyester fiber may be contained in the type and configuration as described above. From the viewpoint of achieving both acceleration of the decarboxylation reaction of aromatic carboxylic acids and control of side reactions, the liquid crystal polyester fiber may contain the above metallic element at a total content of preferably from 1 to 1000 ppm by weight, more preferably from 3 to 500 ppm by weight, still more preferably from 5 to 200 ppm by weight, and further preferably from 10 to 100 ppm by weight. The content of the metallic element in the liquid crystal polyester fiber indicates a ratio of the total weight of the metallic element(s) based on the total weight of the liquid crystal polyester fiber. In the case of containing the metallic element(s) as the metallic compound(s), the content of the metallic element indicates a value converted as a content of a metal atom. Here, the above-mentioned content of the metallic element may be a content of a metallic element in the components constituting the fiber itself, excluding components adhering to the fiber surface such as an oil agent.

From the viewpoint of control of side reactions, the liquid crystal polyester fiber according to the present invention may have a content of an alkaline metal and an alkaline-earth metal in total of less than 100 ppm by weight, preferably 10 ppm by weight or less, more preferably 5 ppm by weight or less, and still more preferably 1 ppm by weight or less. Here, the above content of the alkaline metal and alkaline-earth metal elements may be a content of the alkaline metal and alkaline-earth metal elements in the components constituting the fiber itself, excluding components adhering to the fiber surface such as an oil agent.

The liquid crystal polyester fiber of the present invention may comprise the above-mentioned liquid crystal polyester resin composition and may contain a component(s) other than the liquid crystal polyester and the specific metallic element. The liquid crystal polyester fiber may contain a liquid crystal polyester at a proportion of 50 wt % or more, preferably 80 wt % or more, more 10 preferably 90 wt % or more, further preferably 95 wt % or more, and even more preferably 99.9 wt % or more.

From the viewpoint of suppressing gas generation during heating, the liquid crystal polyester fiber according to the present invention may have a total CEG amount of 5.0 mEq/kg or less, preferably 4.0 mEq/kg or less, more preferably 3.0 mEq/kg or less, further preferably 2.5 mEq/kg or less, and still more preferably 2.0 mEq/kg or less. Although the lower limit of the total CEG amount is not particularly limited, the lower limit may be for example 0.1 mEq/kg or higher. The total CEG amount is a value measured by the method described in the Examples below, and is defined as the amount of carboxy end groups of the liquid crystal polyester molecules in 1 kg of liquid crystal polyester fiber.

From the viewpoint of suppressing gas generation during heating, the liquid crystal polyester fiber according to the present invention may have a total amount of carboxy end groups as carboxyphenyl terminal among carboxy terminals in the liquid crystal polyester molecules of preferably 4.0 mEq/kg or less, preferably 2.5 mEq/kg or less, more preferably 2.0 mEq/kg or less, and further preferably 1.5 mEq/kg or less. The lower limit of the CEG amount of the carboxy group as the carboxyphenyl terminal is not particularly limited, and may be, for example, 0.1 mEq/kg or more.

From the viewpoint of suppressing gas generation during heating, the liquid crystal polyester fiber according to the present invention may have a ratio of the CEG amount of the carboxy group as the carboxyphenyl terminal based on the total CEG amount of 90% or less, preferably 85% or less, and more preferably 80% or less. The lower limit of the ratio of the CEG amount of the carboxy group as the carboxyphenyl terminal based on the total CEG amount is not particularly limited, and may be, for example, 5% or more.

The liquid crystal polyester fiber of the present invention may have a total amount of one-end groups of 50.0 mEq/kg or more, preferably 55.0 mEq/kg or more, and more preferably 60.0 mEq/kg or more. The present invention defines that the total amount of one-end groups in the liquid crystal polyester fiber is a value obtained by dividing a total amount (mEq/kg) of end groups by the molar ratio of the structural units derived from the hydroxycarboxylic acids in the liquid crystal polyester, in which the total amount (mEq/kg) of end groups is a value of (i) carboxy end groups derived from hydroxycarboxylic acids and (ii) end groups from which carbon dioxide was eliminated by decarboxylation reaction from carboxy groups derived from hydroxycarboxylic acids in 1 kg of the liquid crystal polyester fibers. The total amount of one-end groups can be measured by the method described in the Examples below. Where the total amount of one-end groups is within the above range, the polymerization of liquid crystal polyester has not progressed in an excess amount so as to obtain a liquid crystal polyester with a relatively low molecular weight. Such a liquid crystal polyester fiber with a low molecular weight can be used as a heat-fusible fiber. The upper limit of the total amount of one-end groups is not particularly limited, and may be, for example, 200 mEq/kg or less, and preferably 100 mEq/kg or less because too reduced molecular weight may cause impossibility of obtaining fibers with tenacity required for later procedure.

In general, liquid crystal polyester fibers can exhibit very high mechanical properties by increasing the molecular weight of the polymer through solid-phase polymerization by heat treatment of the as-spun yarn (as-spun filament). The liquid crystal polyester fiber according to the present invention, however, may have a tenacity to be processed as heat-fusible fibers for producing fiber-reinforced molded bodies. The liquid crystal polyester fiber may be, for example, an as-spun yarn or a heat-treated yarn subjected to solid phase polymerization to an extent that does not impair the effect of the present invention. Considering that a melting point of a liquid crystal polyester fiber increases from a melting point (Mp) of an as-spun yarn due to solid-phase polymerization, the liquid crystal polyester fiber according to the present invention may be preferably an as-spun yarn when used as a heat-fusible fiber.

The liquid crystal polyester fiber according to the present invention may have a tenacity of lower than 18 cN/dtex, preferably 2 to 16 cN/dtex, and more preferably 6 to 12 cN/dtex. Here, the tenacity of the liquid crystal polyester fiber is a tensile tenacity, and a value measured by the method described in the Examples below.

The liquid crystal polyester fiber according to the present invention may have a melting point of 380° C. or lower, preferably from 250 to 350° C., and more preferably from 260 to 300° C. Here, the melting point of the liquid crystal polyester fiber is a value measured by the method described in the Examples below.

The liquid crystal polyester fiber according to the present invention may have an adjusted single fiber fineness depending on the application, etc. The single fiber fineness, for example, may be 0.5 to 50 dtex, preferably from 1.0 to 35 dtex, more preferably 1.0 to 15 dtex, and even more preferably 1.5 to 10 dtex.

The liquid crystal polyester fiber according to the present invention may be a monofilament or a multifilament. In the case of multifilament, the number of filaments may be adjusted depending on the application, etc. For example, the number of filaments may be 5 to 5000 filaments, preferably 10 to 4000 filaments, and more preferably 30 to 3000 filaments.

The total fineness of the liquid crystal polyester fiber can be adjusted depending on the application, etc. For example, the total fineness may be 10 to 50000 dtex, preferably from 15 to 30000 dtex, and more preferably 25 to 10000 dtex.

The liquid crystal polyester fiber according to the present invention may have an amount of $CO_2$ gas generation, as measured by the method described in the Examples below, of 2.0 mmol/kg or less, preferably 1.5 mmol/kg or less, and more preferably 1.0 mmol/kg or less.

Fiber Structure

The liquid crystal polyester fibers according to the present invention can be used as heat-fusible fibers for producing a molded body using them as a matrix. Where the liquid crystal polyester fibers are used as heat-fusible fibers, a fiber structure at least partially including liquid crystal polyester fibers can be used as an intermediate material in the production of the melt-molded body.

The fiber structure including the liquid crystal polyester fibers according to the present invention can be used as various fiber configuration such as staple fibers, short-cut fibers, filament yarns, spun yarns, cordage, ropes, etc., and also used as fabrics such as nonwoven fabrics, woven fabrics, knitted fabrics, etc., using liquid crystal polyester fibers. Such fibers and fabrics can be produced by using liquid crystal polyester fibers in known methods.

The fiber structure according to the present invention may be made by combining liquid crystal polyester fibers with other fibers as long as the fiber structure does not spoil the effect of the present invention. The fiber structure may be, for example, a combined yarn using liquid crystal polyester fibers and other fibers (e.g., a commingled yarn made from liquid crystal polyester fibers and other fibers or others). The fiber structure may also be a blend fabric using liquid crystal polyester fibers and other fibers (e.g., a combined fabric in which liquid crystal polyester fibers and other fibers are used in combination, a layered material in which a fabric of liquid crystal polyester fibers and a fabric of other fibers are used in combination, or others). Where the fiber structure is used to produce a fiber-reinforced molded body (fiber-reinforced composite), the fiber structure may be a composite fiber or composite fabric, including reinforcing fibers as other fibers. The reinforcing fibers as described above can be used.

According to the present invention, a molded body may be one obtained by molding a fiber structure. Such a molded body may include a molded body from a fiber structure without reinforcing fibers, or may be a fiber-reinforced molded body from a fiber structure with reinforcing fibers. Since the fiber structure can be flexible, such a flexible fiber structure can be easily processed into various three-dimensional deformations, such as cylindrical or domed shapes by weaving or knitting processes.

The molded body can be obtained by heating and molding the fiber structure at or above the melting point of the liquid crystal polyester fiber. The molding method is not limited to a specific one as long as the liquid crystal polyester fibers are melted and integrated, and any of the known molding methods for molded bodies can be used. The liquid crystal polyester fibers according to the present invention can suppress the generation of bubbles during heating for melt-fusing, so as to obtain a molded body of high quality.

The liquid crystal polyester constituting a matrix of the molded body has excellent vibration damping properties, so that the resulting molded body has excellent vibration damping properties and can be effectively used in applications where vibration occurs, such as duct tubes and automobile bumpers.

EXAMPLES

Hereinafter, the present invention will be demonstrated by way of some examples that are presented only for the sake of illustration, which are not to be construed as limiting the scope of the present invention. It should be noted that in the following Examples and Comparative Examples, various properties were evaluated in the following manners.

Melting Point of Liquid Polyester in Resin Chips (Granular Objects) or Fibers

In accordance with JIS K 7121 test method, a melting point (° C.) was determined as a main endothermic peak temperature observed in measurement using a differential scanning calorimeter (DSC; "TA3000" produced by Mettler-Toledo International Inc.). Specifically, a melting point was determined as an endothermic peak from a liquid crystal polyester that occurred when a sample (10 to 20 mg) introduced to an aluminum pan in the DSC device was subjected to a temperature increase at an elevation rate of 20° C./min from 25° C. with supplying nitrogen as a carrier gas at a flow rate of 100 mL/min.

Melting Point of Metallic Compound

A melting point of a metallic compound was measured using the same device and pan as those used in melting point measurement of the liquid crystal polyester. However, in order to remove peaks from hydrated water or a residual solvent, nitrogen was supplied as a carrier gas at a flow rate of 100 mL/min, and a sample in the DSC device was subjected to a temperature increase at an elevation rate of 20° C./min from 25° C. to 150° C. After maintaining the temperature for 1 minute, the sample was cooled at a cooling rate of −20° C./min to 25° C., and then was elevated at 20° C./min from 25° C. to measure the endothermic peak which appears at the lowest temperature.

Content of Metallic Element

In accordance with a procedure described in "microwave digestion" as indicated below, analysis liquid was produced and metallic-elements content (ppm by weight) was calculated by performing ICP-MS measurement.

Microwave Digestion

Microwave digestion was performed using a microwave digestion device "ETHOS-1" produced by Milestone General K. K. Each of the liquid crystal polyester resin composition chip samples or fiber samples (0.1 g) was weighed and inserted to a quartz insert, and then 6 mL of nitric acid (1.42 mol/L) was added. The quartz insert was put into a digestion container containing 5 mL of water and 2 mL of hydrogen peroxide (concentration: 30 wt % to 36 wt %) and sealed, and then microwave digestion was performed. After leaving it to be cooled, the resultant was volumed up to 50 mL and filtered through a filter (pore size: 0.45 μm), and the filtrated object was subjected to ICP-MS measurement.

ICP-MS Measurement

The metallic-elements content in each of the sample liquid produced in the above-mentioned microwave digestion was analyzed using an ICP-MS analysis device "Agirent7900" produced by Agilent Technologies, Inc. Three lots obtained from the same sample liquid were measured under a carrier gas flow rate of 0.7 L/min at an RF output of 1500 W in comparison with XSTC-622 (standard solution produced by SPEX CertiPrep), and the content of each metallic element was determined from the average value.

In a sample such as liquid crystal polyester fibers to which an oil agent was adhered, where the oil agent might contain some metallic elements to affect the measurement, the microwave digestion may be carried out after removing the oil agent by the following methods.

Removal of Oil Agent

Into an aqueous solution in which 2 g of nonionic surfactant (available from Matsumoto Yushi-Seiyaku Co., Ltd., “actinol F-9”) was dissolved in 1 L of ion exchange water, was added a liquid crystal polyester fiber sample in an amount of 100 g or less, followed by temperature control in a range of 60 to 90° C., and then the resultant mixture was shaken for 40 minutes. Thereafter the liquid crystal polyester fiber sample was taken out from the aqueous solution, and rinsed two times at each time for 40 minutes with 1 L of ion exchange water with a controlled temperature in a range of 60 to 90° C. The liquid crystal polyester fiber sample was taken out and dried at 80° C. under air atmosphere for 3 hours or longer using a hot air dryer “DN63HI” produced by Yamato Scientific Co., Ltd. so as to obtain a liquid crystal polyester fiber sample from which an oil agent was removed.

Amount of CEG(s)

Each of liquid crystal polyester resin composition chip samples or fiber samples was subjected to freeze-grinding until having a particle size of d90=100 or less, then to the ground sample was added an excess amount of n-propylamine, followed by heating under agitation at 40° C. for 90 minutes to decompose the sample. In this process, the ester bonds present inside the polymer chain are decomposed into carboxylic acid n-propyl amide and hydroxy groups, while the carboxy end groups (CEG) and hydroxy end groups in the polymer chain are unchanged from the carboxy groups and hydroxy groups. The decomposition products were separated by HPLC method, and peak areas of the separated decomposition products with carboxy groups were compared with calibration curves prepared by HPLC analysis of the respective standard samples so as to quantify the amount (mEq/kg) of the carboxy end groups derived from each of the monomers. For example, the amount of CEG derived from monovalent carboxylic acids such as 4-hydroxybenzoic acid and 6-hydroxy-2-naphthoic acid can be directly determined as the amount of 4-hydroxybenzoic acid and 6-hydroxy-2-naphthoic acid. The amount of CEG derived from divalent carboxylic acids such as terephthalic acid, isophthalic acid, and 2,6-naphthalene dicarboxylic acid can be determined by quantifying the amount of amidation products in which one of two carboxy groups is amidized, such as terephthalic acid mono-n-propyl amide, isophthalic acid mono-n-propyl amide, or 2,6-naphthalene dicarboxylic acid mono-n-propyl amide.

The sum of all the amounts of carboxy end groups contained in each sample was taken as the total carboxy end group amount (total CEG amount) of the sample. The total amount of carboxy end groups as carboxyphenyl terminal (e.g., carboxy end groups derived from monomers with carboxyphenyl groups such as 4-hydroxybenzoic acid, terephthalic acid, and isophthalic acid) contained in each of the samples was used as the CEG amount of carboxy end groups as carboxyphenyl terminal.

Total Amount of One-End Groups

In the same way as the measurement of the above-mentioned amount of CEG(s), each of the liquid crystal polyester resin composition chip samples or fiber samples was decomposed with n-propylamine to determine the total amount of end groups (mEq/kg) of both carboxy end groups derived from hydroxycarboxylic acids and end groups generated by decarboxylation reaction of carboxy groups derived from hydroxycarboxylic acids. For example, the amount of end groups derived from 4-hydroxybenzoic acid can be calculated by quantifying 4-hydroxybenzoic acid and phenol; the amount of end groups derived from 6-hydroxy-2-naphthoic acid can be calculated by quantifying 6-hydroxy-2-naphthoic acid and 2-naphthol. In order to take into consideration the amounts of end groups other than hydroxycarboxylic acids, such as end groups derived from diols and dicarboxylic acids, the total amount of end groups derived from hydroxycarboxylic acids was divided by a molar ratio of structural units derived from hydroxycarboxylic acids in the liquid crystal polyester of the sample, and thus obtained value was regarded as a total amount of one-end groups of the sample.

Melt-Viscosity

Melt-viscosity (Pa·s) of each of the samples was measured using a melt-viscosity measuring apparatus (Capilograph 1C produced by Toyo Seiki Seisaku-sho, Ltd.) with a 1.00 mmϕ×10 mm capillary at a shear rate of 1216 $sec^{-1}$ at a temperature of $Mp_0$+30° C. wherein $Mp_0$ denotes the melting point of liquid crystal polyester (the melting point of the liquid crystal polyester in the resin composition measured above).

Total Fineness and Single Fiber Fineness

In accordance with JIS L 1013: 2010 8.3.1 A method, liquid crystal polyester fibers were reeled into a hank (100 m in total) with 100 rounds each of which had 1 meter using a sizing reel “Wrap Reel by Motor Driven” produced by DAIEI KAGAKU SEIKI MFG. Co., Ltd., to measure a weight of the liquid crystal polyester fibers. The measurement was conducted in duplicate. Each of the weights (g) was multiplied by 100, and the average value was used as a total fineness (dtex) of the liquid crystal polyester fibers. Thus-obtained total fineness was divided by the number of filaments in the liquid crystal polyester fibers so as to give a single-fiber fineness (dtex).

Tenacity

With reference to JIS L 1013: 2010 8.5.1, using an autograph “AGS-100B” produced by Shimadzu Corporation, tensile test was carried out in a condition of a test sample length of 10 cm and an extension speed of 10 cm/min 6 times per sample yarn to obtain an average tensile strength (cN), and a tensile tenacity (cN/dtex) was calculated by dividing the total fineness (dtex) measured by the above-described method.

$CO_2$ Gas Generation Amount

The amount of $CO_2$ gas generation under heating of liquid crystal polyester resin composition chips or liquid crystal polyester fibers was evaluated by the pyrolysis GC-BID method. Specifically, liquid crystal polyester resin composition chips or liquid crystal polyester fibers were subjected to freeze grinding until having a particle size of d90=100 μm or less, and used as a sample for analysis. The sample was treated at 300° C. for 10 minutes using a gas chromatograph (GC) equipped with a pyrolyzer for sample introduction and a dielectric barrier discharge ionization detector (BID) for gas detection. From the generated gas, $CO_2$ gas was separated and detected so as to quantitate an amount of $CO_2$ gas generation. The measurement was carried out in triplicate on the same sample, and the average value was used as the amount of $CO_2$ gas generation (mmol/kg) from the sample.

Evaluation of Bubbling Property of Resin Composition

On a polyimide film (Upilex-S, 125S produced by Ube Industries, Ltd.) prepared as a release film, was placed a 1 mm thick SUS304 metal plate with a square hole of 10 cm on each side. Into the square hole, were evenly spread liquid crystal polyester resin composition chips (from 12 g to 15 g).

Then, a second polyimide film (same as above) was placed on top of the metal plate. The overlaid plates were further clamped from above and below with a pressure of 0.1 MPa or less using a flat plate heating press device and carried out contact heating at a temperature of $M_0$+20° C. where $M_0$ denoted melting point of the liquid crystal polyester for 5 minutes. Thereafter, a pressure of 2 MPa was applied to the heated product for 1 minute and cooled to a temperature of 100° C. or lower under open atmosphere to obtain a liquid crystal polyester resin plate, which was used as a sample for appearance evaluation. The number of bubbles each having a long diameter of 1 mm or more was counted by observing a 6-cm square of the center of sample for appearance evaluation using a loupe on the front and back surfaces.

Evaluation of Bubbling Property of Fibers

A knit fabric of liquid crystal polyester fibers was produced using a circular knitting machine (MR-1, 10 cm diameter, 28 gauge, produced by Maruzen Sangyo Co., Ltd.). The produced fabric was cut into squares of 10 cm on each side, and three layers of this fabric were piled with each other. On a polyimide film (Upilex-S, 125S produced by Ube Industries, Ltd.) prepared as a release film, was placed a 1 mm thick SUS304 metal plate with a square hole of 10 cm on each side. Into the square hole, was inserted the piled fabric as described above. Then, a second polyimide film (same as above) was placed on top of the metal plate. The overlaid plates were further clamped from above and below with a pressure of 0.1 MPa or less using a flat plate heating press device and carried out contact heating at a temperature of $M_0$+20° C. where $M_0$ denoted melting point of the liquid crystal polyester for 5 minutes. Thereafter, a pressure of 2 MPa was applied to the heated product for 1 minute and cooled to a temperature of 100° C. or lower under open atmosphere to obtain a liquid crystal polyester fiber-derived plate, which was used as a sample for appearance evaluation. The number of bubbles each having a long diameter of 1 mm or more was counted by observing a 6-cm square of the center of sample for appearance evaluation using a loupe on the front and back surfaces.

Method of Measuring Residence Time in Extruder

The residence time was determined as a time from the point a pigmented resin was fed into the extruder to the point the pigmented resin was emerged from the tip of the extruder. In other words, graphite powder (AT-No. 20-0.5, particle size: 5 to 11 μm, available from AS ONE Corporation.) was mixed at 5 wt % with each of the resin compositions used in Examples and Comparative Examples. Each of the mixture was melt-knead at a temperature of $M_0$+20° C. where $M_0$ denotes melting point of liquid crystal polyester, followed by extruded and cut to obtain a cut resin (colored resin). Next, using a machine in which the tip of the extruder used in each of the Examples and Comparative Examples was replaced with a 3 mm die via a gear pump, each of the resin composition was performed steady melt extrusion at a melt extrusion temperature and a discharge rate described in each of the Examples and Comparative Examples. During the kneading procedure, the time from the point a small amount of the colored resin was fed to the point the colored resin emerged from the die was measured. The residence time of the resin composition in the extruder was determined by measuring the time. Since the colored resin discharged from the extruder had a color change starting from light hue to dark hue to light hue, the point at which the darkest hue was visually confirmed was used for measuring the emerging point.

It should be noted that the amount of the colored resin suffices as long as the color change of the colored resin can be observed. If the amount of the colored resin is too large, steady melt extrusion may be adversely affected, so that it is recommended to use a smaller amount than the 6-second discharge rate of the non-colored resin (2.8 g for 28 g/min).

Reference Example 1

Into a reactor were added 73 parts by mol of 4-hydroxybenzoic acid, 27 parts by mol of 6-hydroxy-2-naphthoic acid, and 105 parts by mol of acetic anhydride.

The temperature was then elevated from 25° C. to 160° C. at 2° C./min under a nitrogen atmosphere to carry out acetylation by refluxing for 2 hours while maintaining the temperature.

The temperature was then elevated to 310° C. at 2° C./min and maintained for 1 hour, followed by melt-polymerization under decompression (100 Pa) for 1 hour while maintaining the temperature.

Thereafter, the reactor was pressurized with introducing nitrogen into approximately 0.02 to 0.5 MPa while maintaining the temperature at 310° C., the polymerized material was discharged from the discharge port at the bottom of the reactor in the form of a rod, followed by cooled in cooling water, and cut with a rotary cutter to a length diameter of 5 mm or less.

As a result, was obtained a liquid crystal polyester resin (α) ($Mp_0$: 281° C.) in which the structural units (A) and (B) as shown in the following formulae had a molar ratio of (A)/(B)=73/27 and the total content of alkali metal and alkaline earth metal was 10 ppm by weight or less.

Chem. 8

(A)

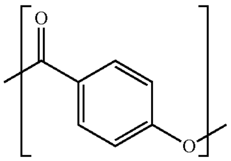

(B)

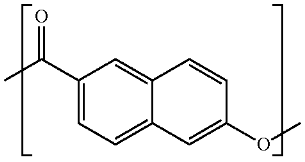

Reference Example 2

Into a reactor were added 65 parts by mol of 4-hydroxybenzoic acid, 10 parts by mol of terephthalic acid, 5 parts by mol of isophthalic acid, 20 parts by mol of 4,4'-dihydroxybiphenyl, and 105 parts by mol of acetic anhydride.

The temperature was then elevated from 25° C. to 160° C. at 2° C./min under a nitrogen atmosphere to carry out acetylation by refluxing for 2 hours while maintaining the temperature.

The temperature was then elevated to 350° C. at 2° C./min and maintained for 1 hour, followed by melt-polymerization under decompression (100 Pa) for 30 minutes while maintaining the temperature.

Thereafter, the reactor was pressurized with introducing nitrogen into approximately 0.02 to 0.5 MPa while maintaining the temperature at 350° C., the polymerized material was discharged from the discharge port at the bottom of the reactor in the form of a rod, followed by cooled in cooling water, and cut with a rotary cutter to a length diameter of 5 mm or less.

As a result, was obtained a liquid crystal polyester resin (β) ($Mp_0$: 348° C.) with a molar ratio of (A)/(C)/(D)/(E)–65/10/5/20 for each structural unit as shown in the following formulae with a total content of alkali metals and alkaline earth metals of 10 ppm by weight or lower.

Chem. 9

(A)

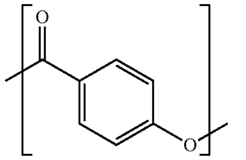

(C)

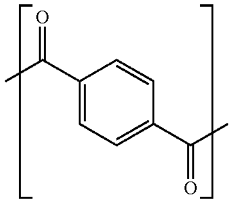

(D)

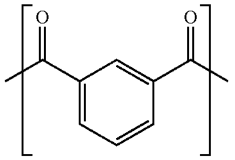

(E)

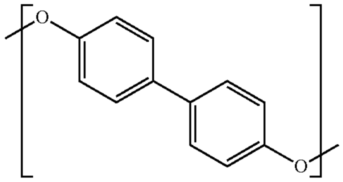

Reference Example 3

Into a reactor were added 54 parts by mol of 4-hydroxybenzoic acid, 15 parts by mol of terephthalic acid, 8 parts by mol of isophthalic acid, 16 parts by mol of 4,4'-dihydroxybiphenyl, 7.7 parts by mol of hydroquinone (including 0.7 part by mol in excess with considering sublimation during polymerization), and 105 parts by mol of acetic anhydride.

The temperature was then elevated from 25° C. to 160° C. at 2° C./min under a nitrogen atmosphere to carry out acetylation by refluxing for 2 hours while maintaining the temperature.

The temperature was then elevated to 350° C. at 2° C./min and maintained for 1 hour, followed by melt-polymerization under decompression (100 Pa) for 30 minutes while maintaining the temperature.

Thereafter, the reactor was pressurized with introducing nitrogen into approximately 0.02 to 0.5 MPa while maintaining the temperature at 350° C., the polymerized material was discharged from the discharge port at the bottom of the reactor in the form of a rod, followed by cooled in cooling water, and cut with a rotary cutter to a length diameter of 5 mm or less.

As a result, was obtained a liquid crystal polyester resin (γ) ($Mp_0$: 315° C.) with a molar ratio of (A)/(C)/(D)/(E)/(F)= 54/15/8/16/7 for each structural unit as shown in the following formulae with a total content of alkali metals and alkaline earth metals of 10 ppm by weight or lower Chem. 10

(A)

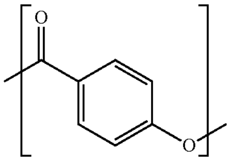

(C)

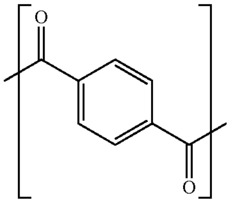

(D)

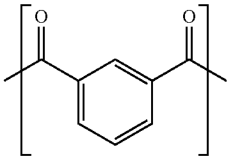

(E)

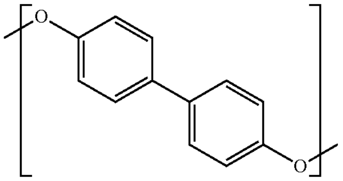

(F)

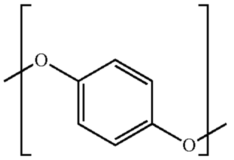

Example 1-1

To chips (granular molded bodies) of the liquid crystal polyester resin (α) ($Mp_0$: 281° C.) obtained in Reference Example 1, was added copper(I) acetate powder (available from FUJIFILM Wako Chemical Corporation, melting point: 271° C.) as a decarboxylation catalyst at a proportion of 50 ppm by weight in terms of copper atoms (a content of copper element relative to a total amount of the resin chip and the catalyst), and mixed sufficiently using a shaking device. Thus-obtained blend of the resin chips and the catalyst was dried under hot air at 120° C. for at least 4 hours, and subjected to a twin-screw extruder (Φ 15 mm) ("KZW15TW-45MG-NH (–700)" produced by TECHNOVEL CORPORATION) to be melt-kneaded at a heater temperature of 300° C. to be fed to a die tip with being metered by a gear pump. In this process, a vacuum pump (dry pump "KRF40A-V-01B" produced by ORION MACHINERY CO., LTD.) was connected via a metal pipe to a vent portion which was provided in the middle of the twin-screw extruder to reduce the pressure in the space not filled with the resin composition in the twin-screw extruder into 60 kPa. The residence time of the resin composition in the extruder was 5 to 6 minutes which was measured separately using the colored resin under these melt-extrusion conditions. The temperature in a range from the extruder outlet to the die tip was set at 310° C. At the die tip, the resin was discharged from a 3 mmϕ circular hole at a discharge rate of 28 g/min in the form of a rod. While taking up a rod-shaped resin composition at a take-up speed of 5 m/min, the rod-shaped resin composition was cut using a rotary cutter to a length diameter of 5 mm or less to obtain resin composition chips. The analysis results of the obtained liquid crystal polyester resin composition chips are shown in Table 5.

Example 1-2

To 5 L of acetonitrile (available from FUJIFILM Wako Pure Chemical Corporation, special grade reagent), were added two kinds of reagents, copper(I) iodide (available from FUJIFILM Wako Pure Chemical Corporation, special grade reagent) at an amount of 1 mol and 1,10-phenanthroline (available from FUJIFILM Wako Chemical Corporation) in equal molar amount with copper(I) iodide, stirred in a condition of suspension for 1 hour, filtered, and dried at 100° C. for 3 hours to obtain an orange solid (melting point: 300° C.).

Except that this solid was used as a decarboxylation catalyst instead of the copper(I) acetate at a proportion of 50 ppm by weight in terms of copper atoms, liquid crystal polyester resin composition chips were obtained in the same way as Example 1-1. The residence time of the resin composition in the extruder was 5 to 6 minutes under these melt-extrusion conditions. The analysis results of the obtained liquid crystal polyester resin composition chips are shown in Table 5.

Example 1-3

Except that copper(II) acetate (available from FUJIFILM Wako Pure Chemical Corporation, Wako first grade, melting point: 115° C.) was added to the resin as a decarboxylation catalyst instead of the copper(I) acetate at a content of 50 ppm by weight in terms of copper atoms, liquid crystal polyester resin composition chips were obtained in the same way as Example 1-1. The residence time of the resin composition in the extruder was 5 to 6 minutes under these melt-extrusion conditions. The analysis results of the obtained liquid crystal polyester resin composition chips are shown in Table 5.

Example 1-4

To 5 L of acetonitrile (available from FUJIFILM Wako Pure Chemical Corporation, special grade reagent), were added two kinds of reagents, copper(II) sulfate pentahydrate (available from FUJIFILM Wako Pure Chemical Corporation, special grade reagent) at an amount of 1 mol and 1,10-phenanthroline (available from FUJIFILM Wako Chemical Corporation) in twice molar amount with copper (II) sulfate pentahydrate, stirred in a condition of suspension for 1 hour, filtered, and dried at 100° C. for 3 hours to obtain a blue solid (melting point: 294° C.). Except that this solid was used as a decarboxylation catalyst instead of the copper (I) acetate at a proportion of 50 ppm by weight in terms of copper atoms, liquid crystal polyester resin composition chips were obtained in the same way as Example 1-1. The residence time of the resin composition in the extruder was 5 to 6 minutes under these melt-extrusion conditions. The analysis results of the obtained liquid crystal polyester resin composition chips are shown in Table 5.

Example 1-5

Except that cobalt(II) acetate tetrahydrate (available from FUJIFILM Wako Pure Chemical Corporation, Wako special grade, melting point: 194° C.) was added to the resin as a decarboxylation catalyst instead of the copper(I) acetate at a proportion of 500 ppm by weight in terms of cobalt atoms, liquid crystal polyester resin composition chips were obtained in the same way as Example 1-1. The residence time of the resin composition in the extruder was 5 to 6 minutes under these melt-extrusion conditions. The analysis results of the obtained liquid crystal polyester resin composition chips are shown in Table 5.

Example 1-6

Except that palladium(II) acetate (available from FUJIFILM Wako Pure Chemical Corporation, Wako special grade, melting point: 205° C.) was added to the resin as a decarboxylation catalyst instead of the copper(I) acetate at a proportion of 500 ppm by weight in terms of palladium atoms, liquid crystal polyester resin composition chips were obtained in the same way as Example 1-1. The residence time of the resin composition in the extruder was 5 to 6 minutes under these melt-extrusion conditions. The analysis results of the obtained liquid crystal polyester resin composition chips are shown in Table 5.

Example 1-7

Except that a proportion of the orange solid (copper(I) iodide and 1,10-phenanthroline) added to the resin was changed into 5 ppm by weight in terms of copper atoms, liquid crystal polyester resin composition chips were obtained in the same way as Example 1-2. The residence time of the resin composition in the extruder was 5 to 6 minutes under these melt-extrusion conditions. The analysis results of the obtained liquid crystal polyester resin composition chips are shown in Table 5.

Example 1-8

Except that a proportion of the orange solid (copper(I) iodide and 1,10-phenanthroline) added to the resin was changed into 500 ppm by weight in terms of copper atoms, liquid crystal polyester resin composition chips were obtained in the same way as Example 1-2. The residence time of the resin composition in the extruder was 5 to 6 minutes under these melt-extrusion conditions. The analysis results of the obtained liquid crystal polyester resin composition chips are shown in Table 5.

Example 1-9

Except that the resin composition was discharged at a discharge rate of 11.0 g/min, liquid crystal polyester resin composition chips were obtained in the same way as Example 1-1. The residence time of the resin composition in the extruder was 12 to 13 minutes under these melt-extrusion conditions. The analysis results of the obtained liquid crystal polyester resin composition chips are shown in Table 5.

Example 1-10

Except that the liquid crystal polyester resin (β) obtained in Reference Example 2 was used instead of the liquid crystal polyester resin (α), that the heater temperature of the extruder during melt extrusion was changed into 360° C., and that the temperature in a range from the extruder outlet to the die tip was changed into 360° C., liquid crystal polyester resin composition chips were obtained in the same way as Example 1-1. The residence time of the resin composition in the extruder was 5 to 6 minutes under these melt-extrusion conditions. The analysis results of the obtained liquid crystal polyester resin composition chips are shown in Table 5.

Example 1-11

Except that the liquid crystal polyester resin (γ) obtained in Reference Example 3 was used instead of the liquid crystal polyester resin (α), that the heater temperature of the extruder during melt extrusion was changed into 340° C., and that the temperature in a range from the extruder outlet to the die tip was changed into 350° C., liquid crystal polyester resin composition chips were obtained in the same way as Example 1-1. The residence time of the resin composition in the extruder was 5 to 6 minutes under these melt-extrusion conditions. The analysis results of the obtained liquid crystal polyester resin composition chips are shown in Table 5.

Example 1-12

Except that a proportion of the orange solid (copper(I) iodide and 1,10-phenanthroline) added to the resin was changed into 10 ppm by weight in terms of copper atoms, liquid crystal polyester resin composition chips were obtained in the same way as Example 1-2. The residence time of the resin composition in the extruder was 5 to 6 minutes under these melt-extrusion conditions. The analysis results of the obtained liquid crystal polyester resin composition chips are shown in Table 5.

Example 1-13

Except that a proportion of the orange solid (copper(I) iodide and 1,10-phenanthroline) added to the resin was changed into 20 ppm by weight in terms of copper atoms, liquid crystal polyester resin composition chips were obtained in the same way as Example 1-2. The residence time of the resin composition in the extruder was 5 to 6 minutes under these melt-extrusion conditions. The analysis results of the obtained liquid crystal polyester resin composition chips are shown in Table 5.

Example 1-14

Except that a proportion of the orange solid (copper(I) iodide and 1,10-phenanthroline) added to the resin was changed into 30 ppm by weight in terms of copper atoms, liquid crystal polyester resin composition chips were obtained in the same way as Example 1-2. The residence time of the resin composition in the extruder was 5 to 6 minutes under these melt-extrusion conditions. The analysis results of the obtained liquid crystal polyester resin composition chips are shown in Table 5.

Example 1-15

Except that a proportion of the orange solid (copper(I) iodide and 1,10-phenanthroline) added to the resin was changed into 70 ppm by weight in terms of copper atoms, liquid crystal polyester resin composition chips were obtained in the same way as Example 1-2. The residence time of the resin composition in the extruder was 5 to 6 minutes under these melt-extrusion conditions. The analysis results of the obtained liquid crystal polyester resin composition chips are shown in Table 5.

Example 1-16

Except that a proportion of the orange solid (copper(I) iodide and 1,10-phenanthroline) added to the resin was changed into 100 ppm by weight in terms of copper atoms, liquid crystal polyester resin composition chips were obtained in the same way as Example 1-2. The residence time of the resin composition in the extruder was 5 to 6 minutes under these melt-extrusion conditions. The analysis results of the obtained liquid crystal polyester resin composition chips are shown in Table 5.

Example 1-17

Except that a proportion of the orange solid (copper(I) iodide and 1,10-phenanthroline) added to the resin was changed into 150 ppm by weight in terms of copper atoms, liquid crystal polyester resin composition chips were obtained in the same way as Example 1-2. The residence time of the resin composition in the extruder was 5 to 6 minutes under these melt-extrusion conditions. The analysis results of the obtained liquid crystal polyester resin composition chips are shown in Table 5.

Comparative Example 1-1

Except that no decarboxylation catalyst was added, liquid crystal polyester resin composition chips were obtained in the same way as Example 1-1. The residence time of the resin composition in the extruder was 5 to 6 minutes under these melt-extrusion conditions. The analysis results of the obtained liquid crystal polyester resin composition chips are shown in Table 5.

Comparative Example 1-2

Except that potassium acetate (available from FUJIFILM Wako Pure Chemical Corporation, special grade reagent) was added to the resin as a catalyst instead of copper(I) acetate at a proportion of 50 ppm by weight in terms of potassium atoms, liquid crystal polyester resin composition chips were obtained in the same way as Example 1-1. The residence time of the resin composition in the extruder was 5 to 6 minutes under these melt-extrusion conditions. The analysis results of the obtained liquid crystal polyester resin composition chips are shown in Table 5.

Comparative Example 1-3

Except that N,N-dimethyl-4-aminopyridine (DMAP) (available from FUJIFILM Wako Pure Chemical Corporation, Wako special grade) was added to the resin at a weight ratio of 1 wt % as a catalyst instead of copper(I) acetate, liquid crystal polyester resin composition chips were obtained in the same way as Example 1-1. The residence time of the resin composition in the extruder was 5 to 6 minutes under these melt-extrusion conditions. The analysis results of the obtained liquid crystal polyester resin composition chips are shown in Table 5.

Comparative Example 1-4

Except that potassium acetate (available from FUJIFILM Wako Pure Chemical Corporation, special grade reagent) was added to the resin as a catalyst instead of copper(I) acetate at a proportion of 50 ppm by weight in terms of potassium atoms, liquid crystal polyester resin composition chips were obtained in the same way as Example 1-10. The residence time of the resin composition in the extruder was 5 to 6 minutes under these melt-extrusion conditions. The analysis results of the obtained liquid crystal polyester resin composition chips are shown in Table 5.

Comparative Example 1-5

Except that potassium acetate (FUJIFILM Wako Pure Chemicals Corporation, special grade reagent) was added to the resin as a catalyst instead of copper(I) acetate at a proportion of 50 ppm by weight in terms of potassium atoms, liquid crystal polyester resin composition chips were obtained in the same way as Example 1-11. The residence time of the resin composition in the extruder was 5 to 6 minutes under these melt-extrusion conditions. The analysis results of the obtained liquid crystal polyester resin composition chips are shown in Table 5.

TABLE 5

| | Resin composition | | | | | Production condition | | Resin composition |
|---|---|---|---|---|---|---|---|---|
| | LCP Spec. | Catalyst Spec. | Metal compnd. melting point ° C. | Metal elemnt. Spec. | Metal elemnt. content added wt ppm | Melt-Kneading temp. ° C. | Residence time in extruder min. | chip Melting point ° C. |
| Ex.1-1 | (α) | copper(I) acetate | 271 | Cu | 50 | 300 | 5 to 6 | 282 |
| Ex.1-2 | (α) | copper(I) iodide• phenanthroline | 300 | Cu | 50 | 300 | 5 to 6 | 281 |
| Ex.1-3 | (α) | copper(II) acetate | 115 | Cu | 50 | 300 | 5 to 6 | 283 |
| Ex.1-4 | (α) | copper(II) sulfate• (phenanthroline); | 294 | Cu | 50 | 300 | 5 to 6 | 282 |
| Ex.1-5 | (α) | cobalt(II) acetate tetrahydrate | 194 | Co | 500 | 300 | 5 to 6 | 282 |
| Ex.1-6 | (α) | palladium(II) acetate | 205 | Pd | 500 | 300 | 5 to 6 | 282 |
| Ex.1-7 | (α) | copper(I) iodide• phenanthroline | 300 | Cu | 5 | 300 | 5 to 6 | 282 |
| Ex.1-8 | (α) | copper(I) iodide• phenanthroline | 300 | Cu | 500 | 300 | 5 to 6 | 281 |
| Ex.1-9 | (α) | copper(I) acetate | 271 | Cu | 50 | 300 | 12 to 13 | 282 |
| Ex.1-10 | (β) | copper(I) acetate | 271 | Cu | 50 | 360 | 5 to 6 | 348 |
| Ex.1-11 | (γ) | copper(I) acetate | 271 | Cu | 50 | 340 | 5 to 6 | 316 |
| Ex.1-12 | (α) | copper(I) iodide• phenanthroline | 300 | Cu | 10 | 300 | 5 to 6 | 282 |
| Ex.1-13 | (α) | copper(I) iodide• phenanthroline | 300 | Cu | 20 | 300 | 5 to 6 | 280 |
| Ex.1-14 | (α) | copper(I) iodide• phenanthroline | 300 | Cu | 30 | 300 | 5 to 6 | 281 |
| Ex. 1-15 | (α) | copper(I) iodide• phenanthroline | 300 | Cu | 70 | 300 | 5 to 6 | 283 |
| Ex.1-16 | (α) | copper(I) iodide• phenanthroline | 300 | Cu | 100 | 300 | 5 to 6 | 282 |
| Ex.1-17 | (α) | copper(I) iodide• phenanthroline | 300 | Cu | 150 | 300 | 5 to 6 | 283 |
| Com. Ex.1-1 | (α) | — | — | — | — | 300 | 5 to 6 | 282 |
| Com. Ex.1-2 | (α) | potassium acetate | 292 | K | 50 | 300 | 5 to 6 | 282 |
| Com. Ex.1-3 | (α) | DMAP | — | — | a) | 300 | 5 to 6 | 281 |
| Com. Ex.1-4 | (β) | potassium acetate | 292 | K | 50 | 360 | 5 to 6 | 349 |
| Com. Ex.1-5 | (γ) | potassium acetate | 292 | K | 50 | 340 | 5 to 6 | 316 |

TABLE 5-continued

| | Resin composition chip | | | | | Evaluation | |
|---|---|---|---|---|---|---|---|
| | Total CEG amt. mEq/kg | Carboxy-Phenyl CEG amt. mEq/kg | Total one-end group amt. mEq/kg | Metal elemnt. content wt ppm | Melt-viscosity Pa · s | $CO_2$ generation mmol/kg | Bubble generation No. |
| Ex.1-1 | 1.9 | 1.4 | 71.2 | 42 | 21.8 | 0.7 | 0 |
| Ex.1-2 | 2.0 | 1.4 | 71.4 | 48 | 22.7 | 0.6 | 0 |
| Ex.1-3 | 2.4 | 1.8 | 69.9 | 45 | 23.6 | 0.7 | 0 |
| Ex.1-4 | 1.8 | 1.3 | 71.0 | 44 | 18.4 | 0.6 | 0 |
| Ex.1-5 | 2.4 | 1.7 | 70.8 | 464 | 18.1 | 0.7 | 0 |
| Ex.1-6 | 2.7 | 1.9 | 72.1 | 430 | 19.1 | 0.8 | 1 |
| Ex.1-7 | 2.8 | 2.1 | 71.5 | 5 | 23.7 | 0.9 | 1 |
| Ex.1-8 | 1.7 | 1.2 | 68.3 | 477 | 18.5 | 0.5 | 0 |
| Ex.1-9 | 1.8 | 1.3 | 69.1 | 49 | 21.2 | 0.8 | 0 |
| Ex.1-10 | 1.9 | 1.9 | 93.2 | 46 | 21.3 | 0.8 | 0 |
| Ex.1-11 | 2.2 | 2.2 | 92.1 | 46 | 20.0 | 0.7 | 0 |
| Ex.1-12 | 2.4 | 1.7 | 71.5 | 9 | 22.7 | 0.7 | 1 |
| Ex.1-13 | 1.9 | 1.5 | 66.7 | 18 | 22.7 | 0.7 | 0 |
| Ex.1-14 | 1.9 | 1.4 | 66.7 | 29 | 22.6 | 0.6 | 0 |
| Ex. 1-15 | 1.9 | 1.5 | 71.3 | 67 | 22.7 | 0.6 | 0 |
| Ex.1-16 | 1.8 | 1.4 | 71.4 | 95 | 22.6 | 0.7 | 0 |
| Ex.1-17 | 1.7 | 1.3 | 62.5 | 144 | 22.6 | 0.6 | 0 |
| Com. Ex.1-1 | 9.7 | 7.1 | 71.4 | — | 22.8 | 3.4 | 6 |
| Com. Ex.1-2 | 9.4 | 7.0 | 71.3 | 51 | 20.1 | 2.9 | 8 |
| Com. Ex.1-3 | 9.6 | 6.9 | 71.2 | — | 21.8 | 3.1 | 8 |
| Com. Ex.1-4 | 22.2 | 22.2 | 94.9 | 48 | 20.7 | 10.9 | 20 |
| Com. Ex.1-5 | 19.7 | 19.7 | 91.8 | 45 | 23.3 | 9.7 | 22 |

a) DMAP is a catalyst without metal. Content of DMAP itself is 1 wt %.

As shown in Table 5, each of the Examples 1-1 to 1-17 containing a specific metallic element is able to accelerate decarboxylation reaction due to its catalytic action, resulting in reduced total CEG amount. Therefore, the liquid crystal polyester compositions of Examples 1-1 to 1-17 are able to suppress the amount of gas generation, so that the resin boards produced from these compositions are also able to suppress the bubble generation.

On the other hand, the liquid crystal polyester resin composition of Comparative Example 1-1 without a catalyst is unable to accelerate decarboxylation reaction, resulting in high total CEG amount. Accordingly, the liquid crystal polyester resin composition of Comparative Example 1-1 generates more than three times as much $CO_2$ gas as those in Examples 1-1 to 1-17 containing catalysts of the specific metallic elements. The resin board produced from this composition generates more air bubbles than those in these Examples.

Comparative Examples 1-3 containing the organic catalyst, as well as Comparative Examples 1-2, 1-4, and 1-5 containing alkali metals, both of them being used as a polymerization catalyst to synthesize liquid crystal polyesters, are unable to exert catalytic effects on the decarboxylation reaction, so that the total CEG amounts indicate large values in all of the liquid crystal polyester resin compositions. Therefore, the liquid crystal polyester resin compositions of Comparative Examples 1-2 to 1-5 generate more than three times as much $CO_2$ gas as those in Examples 1-1 to 1-17 containing decarboxylation catalysts of the specific metallic elements, resulting in generation of more bubbles in the resin boards made from Comparative Examples 1-2 to 1-5 compared to those in Examples 1-1 to 1-17.

Example 2-1

To chips (granular molded bodies) of the liquid crystal polyester resin (α) obtained in Reference Example 1, was added copper(I) acetate powder (available from FUJIFILM Wako Chemical Corporation, melting point: 271° C.) as a decarboxylation catalyst at a proportion of 50 ppm by weight in terms of copper atoms (a content of copper element relative to a total amount of the resin chip and the catalyst), and mixed sufficiently using a shaking device. Thus-obtained blend of the resin chips and the catalyst was dried under hot air at 120° C. for at least 4 hours, and subjected to a twin-screw extruder (Φ15 mm) ("KZW15TW-45MG-NH (-700)" produced by TECHNOVEL CORPORATION) to be melt-extruded at a heater temperature of 300° C. to be fed to a spinning head with being metered by a gear pump. In this process, a vacuum pump (dry pump "KRF40A-V-01B" produced by ORION MACHINERY CO., LTD.) was connected via a metal pipe to a vent portion which was provided in the middle of the twin-screw extruder to reduce the pressure in the space not filled with the resin composition in the twin-screw extruder into 60 kPa. The residence time of the resin composition in the extruder was 5 to 6 minutes which was measured separately using the colored resin under these melt-extrusion conditions. The temperature in a range from the extruder outlet to the spinning head was set at 310° C. The spinning head was equipped with a spinneret with 50 holes, each of the holes having a hole diameter of 0.125 mmϕ and a land length of 0.175 mm, and the resin composition was discharged at a discharge rate of 28 g/min to obtain liquid crystal polyester fibers (as-spun yarns) by winding at a winding rate of 1000 m/min. At this time, a 2 wt % aqueous solution of sodium dodecyl phosphate (available from FUJIFILM Wako Pure Chemical Corporation, Wako first grade) was applied to the as-spun yarns through an oiling guide placed directly below the spinneret. The amount of the aqueous solution applied was 1.4 g/min, and the adhesion proportion of sodium dodecyl phosphate to the as-spun yarns was 0.1 wt % as a calculation value. The analysis results of the obtained liquid crystal polyester fibers are shown in Table 6.

Example 2-2

Except that the orange solid (copper(I) iodide and 1,10-phenanthroline, melting point: 300° C.) recited in Example 1-2 was used as a decarboxylation catalyst instead of copper (I) acetate at a proportion of 50 ppm by weight in terms of copper atoms, liquid crystal polyester fibers (as-spun yarns) were obtained in the same way as Example 2-1. The residence time of the resin composition in the extruder was 5 to 6 minutes under these melt-extrusion conditions. The analysis results of the obtained liquid crystal polyester fibers are shown in Table 6.

Example 2-3

Except that copper(II) acetate (available from FUJIFILM Wako Pure Chemical Corporation, Wako first grade, melting point: 115° C.) was added to the resin as a decarboxylation catalyst instead of copper(I) acetate at a proportion of 50 ppm by weight in terms of copper atoms, liquid crystal polyester fibers (as-spun yarns) were obtained in the same way as Example 2-1. The residence time of the resin composition in the extruder was 5 to 6 minutes under these melt-extrusion conditions. The analysis results of the obtained liquid crystal polyester fibers are shown in Table 6.

Example 2-4

Except that the blue solid (copper(II) sulfate and 1,10-phenanthroline, melting point: 294° C.) recited in Example 1-4 was used as a decarboxylation catalyst instead of copper (I) acetate at a proportion of 50 ppm by weight in terms of copper atoms, liquid crystal polyester fibers (as-spun yarns) were obtained in the same way as Example 2-1. The residence time of the resin composition in the extruder was 5 to 6 minutes under these melt-extrusion conditions. The analysis results of the obtained liquid crystal polyester fibers are shown in Table 6.

Example 2-5

Except that cobalt(II) acetate tetrahydrate (available from FUJIFILM Wako Pure Chemical Corporation, Wako special grade, melting point 194° C.) was added to the resin as a decarboxylation catalyst instead of the copper(I) acetate at a proportion of 500 ppm by weight in terms of cobalt atoms, liquid crystal polyester fibers (as-spun yarns) were obtained in the same way as Example 2-1. The residence time of the resin composition in the extruder was 5 to 6 minutes under these melt-extrusion conditions. The analysis results of the obtained liquid crystal polyester fibers are shown in Table 6.

Example 2-6

Except that palladium(II) acetate (available from FUJIFILM Wako Pure Chemical Corporation, Wako special grade, melting point: 205° C.) was added to the resin as a decarboxylation catalyst instead of the copper(I) acetate at a proportion of 500 ppm by weight in terms of palladium atoms, liquid crystal polyester fibers (as-spun yarns) were obtained in the same way as Example 2-1. The residence time of the resin composition in the extruder was 5 to 6 minutes under these melt-extrusion conditions. The analysis results of the obtained liquid crystal polyester fibers are shown in Table 6.

Example 2-7

Except that a proportion of the orange solid (copper(I) iodide and 1,10-phenanthroline) added to the resin was changed into 5 ppm by weight in terms of copper atoms, liquid crystal polyester fibers (as-spun yarns) were obtained in the same way as Example 2-2. The residence time of the resin composition in the extruder was 5 to 6 minutes under these melt-extrusion conditions. The analysis results of the obtained liquid crystal polyester fibers are shown in Table 6.

Example 2-8

Except that a proportion of the orange solid (copper(I) iodide and 1,10-phenanthroline) added to the resin was changed into 500 ppm by weight in terms of copper atoms, liquid crystal polyester fibers (as-spun yarns) were obtained in the same way as Example 2-2. The residence time of the resin composition in the extruder was 5 to 6 minutes under these melt-extrusion conditions. The analysis results of the obtained liquid crystal polyester fibers are shown in Table 6.

Example 2-9

To chips (granular molded bodies) of the liquid crystal polyester resin (α) obtained in Reference Example 1, was added copper(I) acetate powder (available from FUJIFILM Wako Chemical Corporation, melting point: 271° C.) as a decarboxylation catalyst at a proportion of 500 ppm by weight in terms of copper atoms, and mixed sufficiently using a shaking device. Thus-obtained blend of the resin chips and the catalyst was dried under hot air at 120° C. for at least 4 hours, and subjected to a twin-screw extruder (Φ 15 mm) ("KZW15TW-45MG-NH (−700)" produced by TECHNOVEL CORPORATION) to be melt-extruded at a heater temperature of 300° C. to be fed to a die tip with being metered by a gear pump. In this process, a vacuum pump (dry pump "KRF40A-V-01B" produced by ORION MACHINERY CO., LTD.) was connected via a metal pipe to a vent portion which was provided in the middle of the twin-screw extruder to reduce the pressure in the space not filled with the resin composition in the twin-screw extruder into 60 kPa. The residence time of the resin composition in the extruder was 5 to 6 minutes under these melt-extrusion conditions. The temperature in a range from the extruder outlet to the die tip was set at 310° C. At the die tip, the resin was discharged from a 3 mm circular hole at a discharge rate of 28 g/min in the form of a rod. While taking up a rod-shaped resin composition at a take-up speed of 5 m/min, the rod-shaped resin composition was cut using a rotary cutter to a length diameter of 5 mm or less to obtain resin composition chips.

Thus-obtained resin composition chips (mixed with 500 ppm by weight of copper element) and the chips of the liquid crystal polyester resin (α) were blended at a weight ratio of 1:9, and well-mixed using a shaking device, and dried under hot air at 120° C. for at least 4 hours. The blend mixture of two species of chips was subjected to a twin-screw extruder (Φ 15 mm) ("KZW15TW-45MG-NH (−700)" produced by TECHNOVEL CORPORATION) to be melt-extruded at a heater temperature of 300° C. to be fed to a spinning head with being metered by a gear pump. In this process, a vacuum pump (dry pump "KRF40A-V-01B" produced by ORION MACHINERY CO., LTD.) was connected via a metal pipe to a vent portion which was provided in the middle of the twin-screw extruder to reduce the pressure in the space not filled with the resin composition in the twin-screw extruder into 60 kPa. The residence time of the resin composition in the extruder was 5 to 6 minutes under these melt-extrusion conditions. The temperature in a range from the extruder outlet to the spinning head was set at 310° C. The spinning head was equipped with a spinneret with 50 holes, each of the holes having a hole diameter of 0.125 mmϕ and a land length of 0.175 mm, and the resin composition was discharged at a discharge rate of 28 g/min to obtain liquid crystal polyester fibers (as-spun yarns) by winding at a winding rate of 1000 m/min. At this time, a 2 wt % aqueous solution of sodium dodecyl phosphate (available from FUJIFILM Wako Pure Chemical Corporation, Wako first grade) was applied to the as-spun yarn through an oiling guide placed directly below the spinneret. The amount of the aqueous solution applied was 1.4 g/min, and the adhesion proportion of sodium dodecyl phosphate to the as-spun yarns was 0.1 wt % as a calculation value. The analysis results of the obtained liquid crystal polyester fibers are shown in Table 6.

Example 2-10

Except for using the spinning head equipped with a spinneret with 100 holes, each of the holes having a hole diameter of 0.100 mmϕ and a land length of 0.140 mm, liquid crystal polyester fibers (as-spun yarns) were obtained in the same way as Example 2-1. The residence time of the resin composition in the extruder was 5 to 6 minutes under these melt-extrusion conditions. The analysis results of the obtained liquid crystal polyester fibers are shown in Table 6.

Example 2-11

Except for using the spinning head equipped with a spinneret with 20 holes, each of the holes having a hole diameter of 0.150 mmϕ and a land length of 0.210 mm, liquid crystal polyester fibers (as-spun yarns) were obtained in the same way as Example 2-1. The residence time of the resin composition in the extruder was 5 to 6 minutes under these melt-extrusion conditions. The analysis results of the obtained liquid crystal polyester fibers are shown in Table 6.

Example 2-12

Except that the spinning head equipped with a spinneret with 20 holes, each of the holes having a hole diameter of 0.125 mmϕ and a land length of 0.175 mm was used; that the resin composition was discharged at a discharge rate of 11.0 g/min; and that the amount of the aqueous solution of sodium dodecyl phosphate applied from the oiling guide was 0.55 g/min; liquid crystal polyester fibers (as-spun yarns) were obtained in the same way as Example 2-1. The residence time of the resin composition in the extruder was 12 to 13 minutes under these melt-extrusion conditions. The analysis results of the obtained liquid crystal polyester fibers are shown in Table 6.

Example 2-13

Except that the liquid crystal polyester resin (β) obtained in Reference Example 2 was used instead of the liquid crystal polyester resin (α), that the heater temperature of the extruder during melt extrusion was changed into 360° C., and that the temperature in a range from the extruder outlet to the spinning head was changed into 360° C., liquid crystal polyester fibers (as-spun yarns) were obtained in the same way as Example 2-1. The residence time of the resin composition in the extruder was 5 to 6 minutes under these melt-extrusion conditions. The analysis results of the obtained liquid crystal polyester fibers are shown in Table 6.

Example 2-14

Except that the liquid crystal polyester resin (γ) obtained in Reference Example 3 was used instead of the liquid crystal polyester resin (α), that the heater temperature of the extruder during melt extrusion was changed into 340° C., and that the temperature in a range from the extruder outlet to the spinning head was changed into 350° C., liquid crystal polyester fibers (as-spun yarns) were obtained in the same way as Example 2-1. The residence time of the resin composition in the extruder was 5 to 6 minutes under these melt-extrusion conditions. The analysis results of the obtained liquid crystal polyester fibers are shown in Table 6.

Example 2-15

Except that a proportion of the orange solid (copper(I) iodide and 1,10-phenanthroline) added to the resin was changed into 10 ppm by weight in terms of copper atoms, liquid crystal polyester fibers (as-spun yarns) were obtained in the same way as Example 2-2. The residence time of the resin composition in the extruder was 5 to 6 minutes under these melt-extrusion conditions. The analysis results of the obtained liquid crystal polyester fibers are shown in Table 6.

Example 2-16

Except that a proportion of the orange solid (copper(I) iodide and 1,10-phenanthroline) added to the resin was changed into 20 ppm by weight in terms of copper atoms, liquid crystal polyester fibers (as-spun yarns) were obtained in the same way as Example 2-2. The residence time of the resin composition in the extruder was 5 to 6 minutes under these melt-extrusion conditions. The analysis results of the obtained liquid crystal polyester fibers are shown in Table 6.

Example 2-17

Except that a proportion of the orange solid (copper(I) iodide and 1,10-phenanthroline) added to the resin was changed into 30 ppm by weight in terms of copper atoms, liquid crystal polyester fibers (as-spun yarns) were obtained in the same way as Example 2-2. The residence time of the resin composition in the extruder was 5 to 6 minutes under these melt-extrusion conditions. The analysis results of the obtained liquid crystal polyester fibers are shown in Table 6.

Example 2-18

Except that a proportion of the orange solid (copper(I) iodide and 1,10-phenanthroline) added to the resin was changed into 70 ppm by weight in terms of copper atoms, liquid crystal polyester fibers (as-spun yarns) were obtained in the same way as Example 2-2. The residence time of the resin composition in the extruder was 5 to 6 minutes under these melt-extrusion conditions. The analysis results of the obtained liquid crystal polyester fibers are shown in Table 6.

Example 2-19

Except that a proportion of the orange solid (copper(I) iodide and 1,10-phenanthroline) added to the resin was changed into 100 ppm by weight in terms of copper atoms, liquid crystal polyester fibers (as-spun yarns) were obtained in the same way as Example 2-2. The residence time of the resin composition in the extruder was 5 to 6 minutes under these melt-extrusion conditions. The analysis results of the obtained liquid crystal polyester fibers are shown in Table 6.

Example 2-20

Except that a proportion of the orange solid (copper(I) iodide and 1,10-phenanthroline) added to the resin was changed into 150 ppm by weight in terms of copper atoms, liquid crystal polyester fibers (as-spun yarns) were obtained in the same way as Example 2-2. The residence time of the resin composition in the extruder was 5 to 6 minutes under these melt-extrusion conditions. The analysis results of the obtained liquid crystal polyester fibers are shown in Table 6.

Comparative Example 2-1

Except that no decarboxylation catalyst was added, liquid crystal polyester fibers (as-spun yarns) were obtained in the same way as Example 2-1. The residence time of the resin composition in the extruder was 5 to 6 minutes under these melt-extrusion conditions. The analysis results of the obtained liquid crystal polyester fibers are shown in Table 6.

Comparative Example 2-2

Except that potassium acetate (available from FUJIFILM Wako Pure Chemical Corporation, special grade reagent) was added to the resin as a catalyst instead of copper(I) acetate at a proportion of 50 ppm by weight in terms of potassium atoms, liquid crystal polyester fibers (as-spun yarns) were obtained in the same way as Example 2-1. The residence time of the resin composition in the extruder was 5 to 6 minutes under these melt-extrusion conditions. The analysis results of the obtained liquid crystal polyester fibers are shown in Table 6.

Comparative Example 2-3

Except that N,N-dimethyl-4-aminopyridine (DMAP) (available from FUJIFILM Wako Pure Chemical Corporation, special grade reagent) was added to the resin at a weight ratio of 1 wt % as a catalyst instead of copper(I) acetate, liquid crystal polyester fibers (as-spun yarns) were obtained in the same way as Example 2-1. The residence time of the resin composition in the extruder was 5 to 6 minutes under these melt-extrusion conditions. The analysis results of the obtained liquid crystal polyester fibers are shown in Table 6.

Comparative Example 2-4

Except that potassium acetate (available from FUJIFILM Wako Pure Chemical Corporation, special grade reagent) was added to the resin as a catalyst instead of copper(1) acetate at a proportion of 50 ppm by weight in terms of potassium atoms, liquid crystal polyester fibers (as-spun yarns) were obtained in the same way as Example 2-13. The residence time of the resin composition in the extruder was 5 to 6 minutes under these melt-extrusion conditions. The analysis results of the obtained liquid crystal polyester fibers are shown in Table 6.

Comparative Example 2-5

Except that potassium acetate (available from FUJIFILM Wako Pure Chemical Corporation, special grade reagent) was added to the resin as a catalyst instead of copper(I) acetate at a proportion of 50 ppm by weight in terms of potassium atoms, liquid crystal polyester fibers (as-spun yarns) were obtained in the same way as Example 2-14. The residence time of the resin composition in the extruder was 5 to 6 minutes under these melt-extrusion conditions. The analysis results of the obtained liquid crystal polyester fibers are shown in Table 6.

TABLE 6

| | Resin composition | | | | | Production condition | | | Fiber analysis (As-spun yarn) | |
|---|---|---|---|---|---|---|---|---|---|---|
| | LCP Spec. | Catalyst Spec. | Metal compnd. melting point ° C. | Metal elemnt. Spec. | Metal elemnt. content added wt ppm | Melt-Kneading temp. ° C. | Residence time in extruder min. | Spinning temp. ° C. | Total fine-ness dtex | Single fiber fine-ness dtex |
| Ex.2-1 | (α) | copper(I) acetate | 271 | Cu | 50 | 300 | 5 to 6 | 310 | 280 | 5.6 |
| Ex.2-2 | (α) | copper(I) iodide• phenanthroline | 300 | Cu | 50 | 300 | 5 to 6 | 310 | 280 | 5.6 |
| Ex.2-3 | (α) | copper(II) acetate | 115 | Cu | 50 | 300 | 5 to 6 | 310 | 280 | 5.6 |
| Ex.2-4 | (α) | copper(II) sulfate• (phenanthroline) | 294 | Cu | 50 | 300 | 5 to 6 | 310 | 280 | 5.6 |
| Ex.2-5 | (α) | cobalt(II) acetate tetrahydrate | 194 | Co | 500 | 300 | 5 to 6 | 310 | 280 | 5.6 |
| Ex.2-6 | (α) | palladium(II) acetate | 205 | Pd | 500 | 300 | 5 to 6 | 310 | 280 | 5.6 |
| Ex.2-7 | (α) | copper(I) iodide• phenanthroline | 300 | Cu | 5 | 300 | 5 to 6 | 310 | 280 | 5.6 |
| Ex.2-8 | (α) | copper(I) iodide• phenanthroline | 300 | Cu | 500 | 300 | 5 to 6 | 310 | 280 | 5.6 |
| Ex.2-9 | (α) | copper(I) acetate | 271 | Cu | 50 | 300 | 5 to 6 | 310 | 280 | 5.6 |
| Ex.2-10 | (α) | copper(1) acetate | 271 | Cu | 50 | 300 | 5 to 6 | 310 | 280 | 2.8 |

TABLE 6-continued

| | | | | | | | | | | |
|---|---|---|---|---|---|---|---|---|---|---|
| Ex.2. 11 | (α) | copper(I) acetate | 271 | Cu | 50 | 300 | 5 to 6 | 310 | 280 | 14 |
| Ex.2- 12 | (α) | copper(I) acetate | 271 | Cu | 50 | 300 | 12 to 13 | 310 | 110 | 5.5 |
| Ex.2- 13 | (β) | copper(I) acetate | 271 | Cu | 50 | 360 | 5 to 6 | 360 | 280 | 5.6 |
| Ex.2- 14 | (γ) | copper(I) acetate | 271 | Cu | 50 | 340 | 5 to 6 | 350 | 280 | 5.6 |
| Ex.2- 15 | (α) | copper(I) iodide• phenanthroline | 300 | Cu | 10 | 300 | 5 to 6 | 310 | 280 | 5.6 |
| Ex.2 16 | (α) | copper(I) iodide• phenanthroline | 300 | Cu | 20 | 300 | 5 to 6 | 310 | 280 | 5.6 |
| Ex.2- 17 | (α) | copper(I) iodide• phenanthroline | 300 | Cu | 30 | 300 | 5 to 6 | 310 | 280 | 5.6 |
| Ex.2- 18 | (α) | copper(I) iodide• phenanthroline | 300 | Cu | 70 | 300 | 5 to 6 | 310 | 280 | 5.6 |
| Ex.2- 19 | (α) | copper(I) iodide• phenanthroline | 300 | Cu | 100 | 300 | 5 to 6 | 310 | 280 | 5.6 |
| Ex.2- 20 | (α) | copper(I) iodide• phenanthroline | 300 | Cu | 150 | 300 | 5 to 6 | 310 | 280 | 5.6 |
| Com. Ex. 1 | (α) | — | — | — | — | 300 | 5 to 6 | 310 | 280 | 5.6 |
| Com Ex. 2 | (α) | potassium acetate | 292 | K | 50 | 300 | 5 to 6 | 310 | 280 | 5.6 |
| Com. Ex. 3 | (α) | DMAP | — | — | a) | 300 | 5 to 6 | 310 | 280 | 5.6 |
| Com. Ex. 4 | (β) | potassium acetate | 292 | K | 50 | 360 | 5 to 6 | 360 | 280 | 5.6 |
| Com Ex. 5 | (γ) | potassium acetate | 292 | K | 50 | 340 | 5 to 6 | 350 | 280 | 5.6 |

| | Fiber analysis (As-spun yarn) | | | | | | | Evaluation | |
|---|---|---|---|---|---|---|---|---|---|
| | Fila-ment No. | Tenacity cN/dtex | Melting point ° C. | Total CEG amt. mEq/kg | Carboxy-Phenyl CEG amt. mEq/kg | Total one-end group amt. mEq/kg | Metal elemnt. content wt ppm | $CO_2$ gene-ration mmol/kg | Bubble gene-ration No. |
| Ex.2-1 | 50 | 9.4 | 281 | 1.8 | 1.3 | 70.1 | 41 | 0.7 | 0 |
| Ex.2-2 | 50 | 9.3 | 281 | 2.1 | 1.5 | 71.0 | 46 | 0.7 | 0 |
| Ex.2-3 | 50 | 9.5 | 282 | 2.1 | 1.5 | 65.3 | 43 | 0.7 | 1 |
| Ex.2-4 | 50 | 9.4 | 282 | 1.8 | 1.3 | 65.1 | 44 | 0.6 | 0 |
| Ex.2-5 | 50 | 8.7 | 283 | 2.3 | 1.7 | 65.3 | 472 | 0.7 | 1 |
| Ex.2-6 | 50 | 8.8 | 282 | 2.6 | 1.9 | 71.1 | 419 | 0.7 | 0 |
| Ex.2-7 | 50 | 9.3 | 282 | 2.6 | 1.8 | 71.0 | 3 | 0.8 | 0 |
| Ex.2-8 | 50 | 8.5 | 282 | 1.7 | 1.2 | 61.3 | 415 | 0.6 | 0 |
| Ex.2-9 | 50 | 9.4 | 282 | 1.6 | 1.2 | 66.7 | 45 | 0.7 | 0 |
| Ex.2- 10 | 100 | 9.3 | 281 | 2.2 | 1.6 | 66.7 | 44 | 0.7 | 0 |
| Ex.2. 11 | 20 | 9.3 | 282 | 2.3 | 1.7 | 71.3 | 41 | 0.7 | 0 |
| Ex.2- 12 | 20 | 9.6 | 282 | 1.8 | 1.3 | 66.6 | 42 | 0.8 | 0 |
| Ex.2- 13 | 50 | 6.9 | 349 | 1.8 | 1.8 | 95.4 | 45 | 0.7 | 0 |
| Ex.2- 14 | 50 | 8.0 | 316 | 2.0 | 2.0 | 93.1 | 46 | 0.7 | 1 |
| Ex.2- 15 | 50 | 9.4 | 281 | 2.3 | 1.6 | 71.8 | 9 | 0.6 | 1 |
| Ex.2 16 | 50 | 9.4 | 281 | 1.9 | 1.4 | 72.1 | 18 | 0.7 | 0 |
| Ex.2- 17 | 50 | 9.3 | 282 | 1.9 | 1.4 | 67.2 | 28 | 0.6 | 0 |
| Ex.2- 18 | 50 | 9.3 | 282 | 1.8 | 1.4 | 66.8 | 66 | 0.6 | 0 |
| Ex.2- 19 | 50 | 9.3 | 282 | 1.8 | 1.4 | 66.7 | 97 | 0.7 | 0 |
| Ex.2- 20 | 50 | 9.1 | 281 | 1.7 | 1.3 | 61.3 | 145 | 0.6 | 0 |
| Com. Ex. 1 | 50 | 9.2 | 282 | 9.0 | 6.5 | 71.0 | — | 3.1 | 6 |
| Com Ex. 2 | 50 | 9.6 | 281 | 8.9 | 6.5 | 71.3 | 41 | 3.0 | 6 |
| Com. Ex. 3 | 50 | 9.1 | 282 | 9.1 | 6.6 | 71.4 | — | 3.1 | 7 |
| Com. Ex. 4 | 50 | 7.1 | 349 | 21.8 | 21.8 | 95.2 | 40 | 11.5 | 26 |

TABLE 6-continued

| | | | | | | | | | |
|---|---|---|---|---|---|---|---|---|---|
| Com Ex. 5 | 50 | 8.4 | 317 | 18.7 | 18.7 | 92.5 | 43 | 10.0 | 21 |

a) DMAP is a catalyst without metal. Content of DMAP itself is 1 wt %.

As shown in Table 6, each of the Examples 2-1 to 2-20 containing a specific metallic element is able to accelerate decarboxylation reaction due to its catalytic action, resulting in reduced total CEG amount. Therefore, the liquid crystal polyester fibers of Examples 2-1 to 2-20 are able to suppress the amount of gas generation, so that the resin boards produced from these fibers are also able to suppress the bubble generation.

On the other hand, the liquid crystal polyester fibers of Comparative Example 2-1 without a catalyst are unable to accelerate decarboxylation reaction, resulting in high total CEG amount. Accordingly, the liquid crystal polyester fibers of Comparative Example 2-1 generate more than three times as much $CO_2$ gas as those in Examples 2-1 to 2-20 containing catalysts of the specific metallic elements. The resin board produced from these fibers generate more air bubbles than those in these Examples.

Comparative Examples 2-3 containing the organic catalyst, as well as Comparative Examples 2-2, 2-4, and 2-5 containing alkali metals, both of them being used as a polymerization catalyst to synthesize liquid crystal polyesters, are unable to exert catalytic effects on decarboxylation reaction, so that the total CEG amounts indicate large values in all of the liquid crystal polyester fibers. Therefore, the liquid crystal polyester fibers of Comparative Examples 2-2 to 2-5 generate more than three times as much $CO_2$ gas as those in Examples 2-1 to 2-20 containing decarboxylation catalysts of the specific metallic elements, resulting in generation of more bubbles in the resin boards made from Comparative Examples 2-2 to 2-5 compared to those in Examples 2-1 to 2-20.

INDUSTRIAL APPLICABILITY

The liquid crystal polyester resin composition according to the present invention can suppress gas generation during heating, so that it is possible to produce a molded body of good quality with few air bubbles by melt molding. Example of the melt-molded bodies may include molded bodies having various shapes such as three-dimensional shapes, sheets, films, and fibers. The resulting molded bodies have excellent vibration-damping properties and are effective for applications where vibration occurs, such as duct tubes and automobile bumpers.

The liquid crystal polyester fibers can be used as melt-fusible fibers for producing molded bodies (e.g., fiber-reinforced composites) due to reduced gas generation during heating.

Preferred embodiments of the present invention are shown and described. It is to be understood that various changes, modifications and omissions may be made without departing from the spirit of the present invention and are encompassed in the scope of the claims.

What is claimed is:

1. A liquid crystal polyester resin composition comprising a liquid crystal polyester and at least one metallic element selected from the group consisting of copper, cobalt, and palladium, wherein when the at least one metallic element is copper, the valence of copper is monovalent, wherein a total amount of carboxy end groups (total CEG amount) in the liquid crystal polyester is 5.0 mg/kg or less, and wherein the liquid crystal polyester consists of a combination of structural units represented by any one of the following formulae (1) to (16) and (18):

(1)

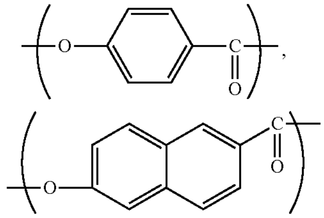

(2)

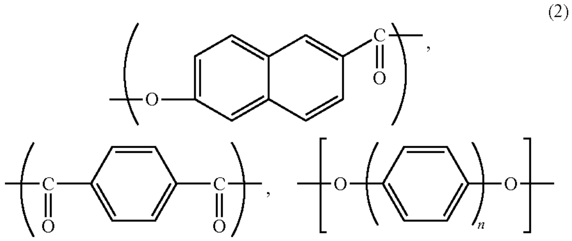

(3)

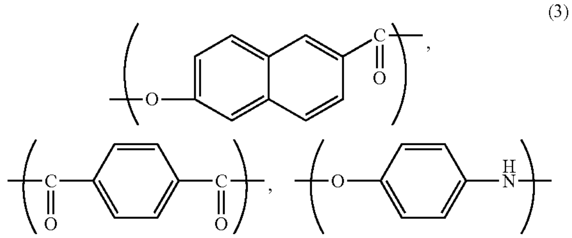

(4)

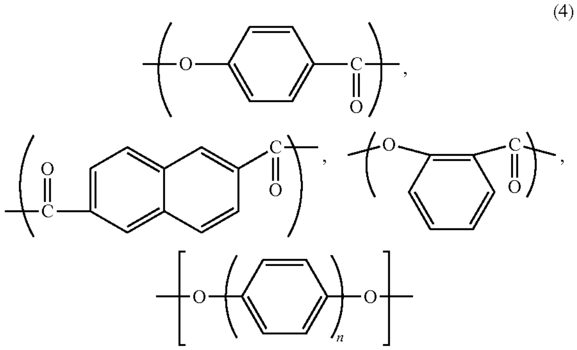

(5)

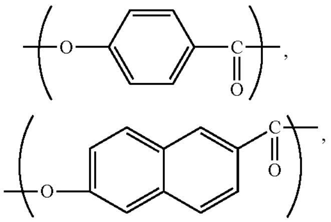

-continued
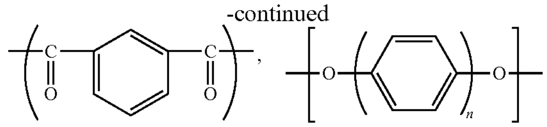
(6)
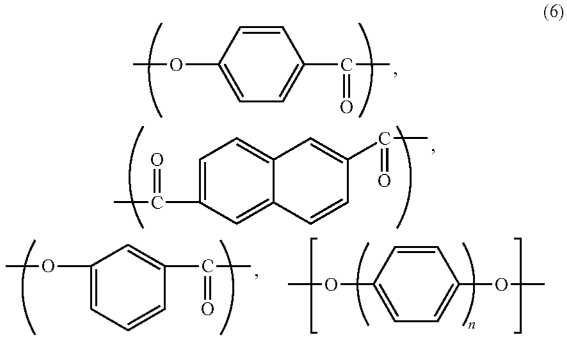
(7)
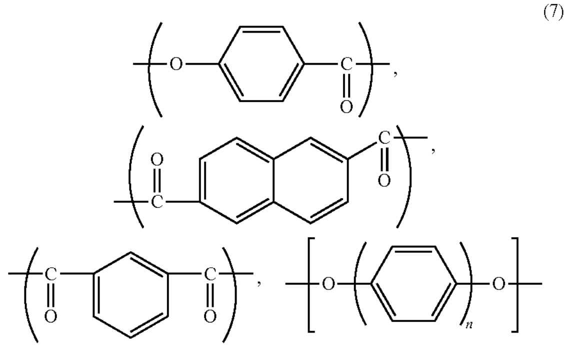
(8)
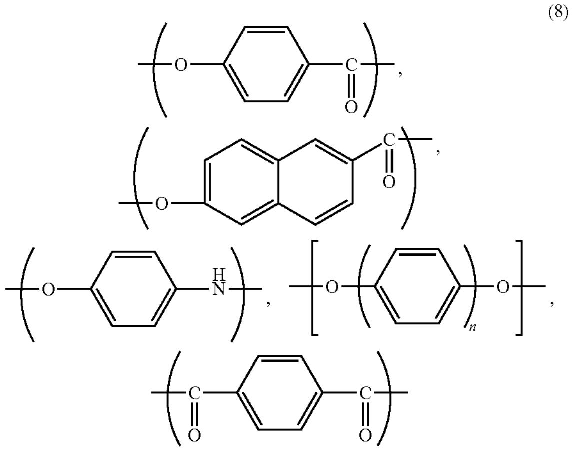
(9)
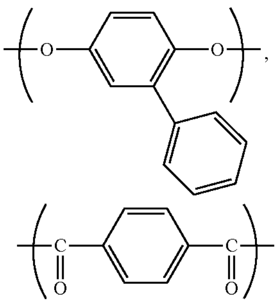
(10)
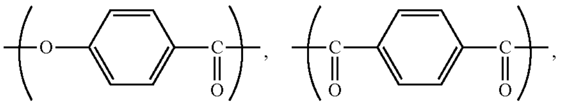
-continued
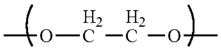
(11)
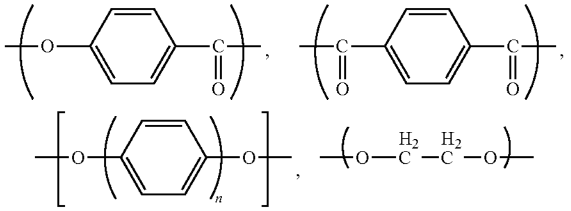
(12)
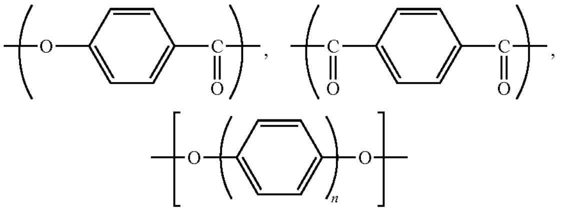
(13)
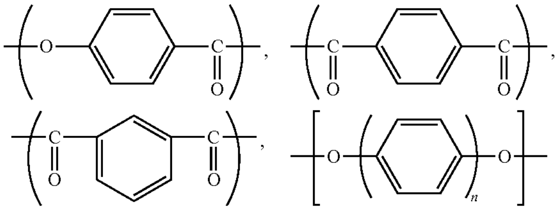
(14)
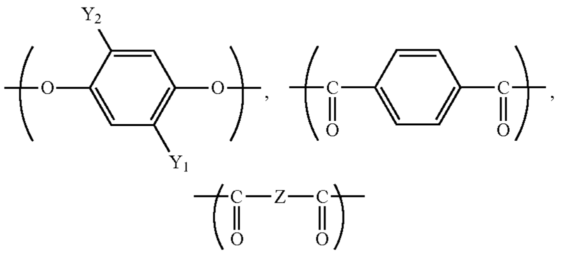
(15)
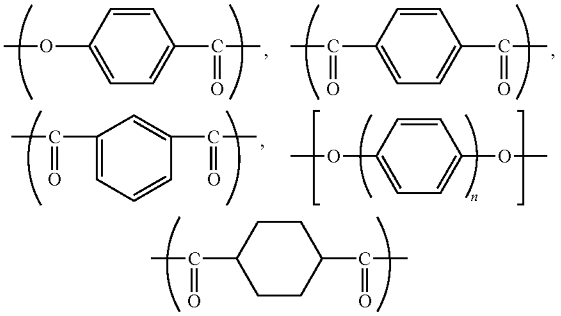
(16)
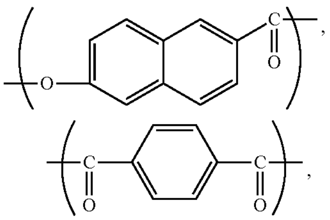

-continued

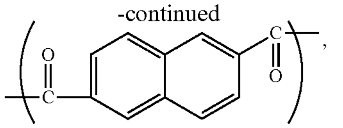

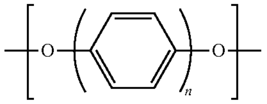

(18)

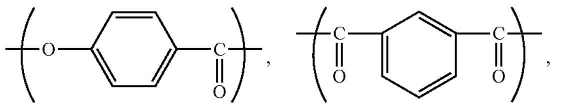

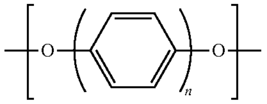

in which n is an integer of 1 or 2, among each of the structural units, n=1 and n=2 may independently exist, or may exist in combination; each of the $Y_1$ and $Y_2$ independently represents a hydrogen atom, a halogen atom, an alkyl group, an alkoxy group, an aryl group, an aralkyl group, an aryloxy group, or an aralkyloxy group; and Z is a substitutional group represented by any one of the following formulae:

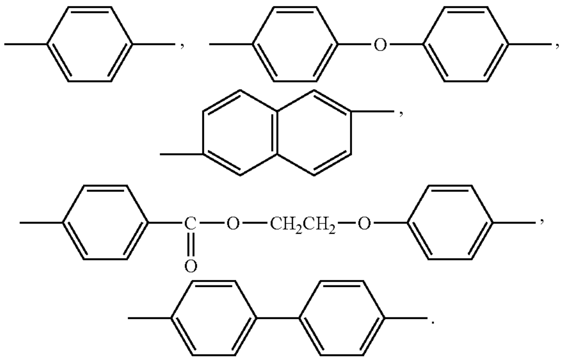

2. The liquid crystal polyester resin composition according to claim 1, wherein a total content of the at least one metallic element is from 1 to 1000 ppm by weight.

3. The liquid crystal polyester resin composition according to claim 1, wherein a total amount of one-end groups in the liquid crystal polyester is 50 mEq/kg or more.

4. The liquid crystal polyester resin composition according to claim 1, wherein the liquid crystal polyester resin composition has a melt-viscosity of 10 to 100 Pa·s measured at a shear rate of 1216 sec-1 at a temperature of ($Mp_0$+30)° C., wherein the $Mp_0$ denotes a melting point of the liquid crystal polyester.

5. The liquid crystal polyester resin composition according to claim 1, wherein the liquid crystal polyester comprises a structural unit derived from 4-hydroxybenzoic acid and a structural unit derived from 6-hydroxy-2-naphthoic acid; or comprises a structural unit derived from 4-hydroxybenzoic acid, a structural unit derived from an aromatic dicarboxylic acid and a structural unit derived from an aromatic diol.

6. The liquid crystal polyester resin composition according to claim 1, wherein the liquid crystal polyester comprises a structural unit derived from 4-hydroxybenzoic acid at a proportion of 50 mol % or more.

7. The liquid crystal polyester resin composition according to claim 1, wherein the at least one metallic element is contained as one or more metallic compounds each having a melting point of ($Mp_0$+30° C.) or lower, wherein the $Mp_0$ denotes a melting point of the liquid crystal polyester.

8. The liquid crystal polyester resin composition according to claim 7, wherein the one or more metallic compounds are at least one compound selected from the group consisting of organic acid salts, inorganic acid salts, halides, hydroxides and metal complex compounds.

9. The liquid crystal polyester resin composition according to claim 1, wherein a total content of an alkaline metal and an alkaline-earth metal is 10 ppm by weight or less in the liquid crystal polyester resin composition.

10. A liquid crystal polyester fiber comprising the liquid crystal polyester resin composition as recited in claim 1.

11. The liquid crystal polyester fiber according to claim 10, having a melting point of 380° C. or lower.

12. The liquid crystal polyester fiber according to claim 10, having a tenacity of lower than 18 cN/dtex.

13. A method for producing a liquid crystal polyester fiber at least comprising: melt-kneading the liquid crystal polyester resin composition as recited in claim 1 to obtain a melt-kneaded material, and spinning by discharging the melt-kneaded material from a spinneret.

14. A fiber structure at least partially comprising the liquid crystal polyester fiber as recited in claim 10.

15. The fiber structure according to claim 14, further comprising a reinforcing fiber.

16. A melt-molded body obtained from the liquid crystal polyester resin composition as recited in claim 1.

17. A method for producing a melt-molded body comprising: melt-molding the liquid crystal polyester resin composition as recited in claim 1 at a temperature of equal to or higher than a melting point of the liquid crystal polyester.

18. A method for producing a melt-molded body comprising: melt-molding the fiber structure as recited in claim 14 at a temperature of equal to or higher than a melting point of the liquid crystal polyester fiber.

19. A liquid crystal polyester resin composition comprising a liquid crystal polyester and at least one metallic element selected from the group consisting of copper, cobalt, and palladium, wherein when the at least one metallic element is copper, the valence of copper is monovalent, wherein a total content of the at least one metallic element is from 1 to 1000 ppm by weight, wherein a total amount of carboxy end groups (total CEG amount) in the liquid crystal polyester is 5.0 mg/kg or less, and wherein a total content of an alkaline metal and an alkaline-earth metal is 10 ppm by weight or less in the liquid crystal polyester resin composition.

20. A liquid crystal polyester resin composition comprising a liquid crystal polyester and at least one metallic element selected from the group consisting of copper, cobalt, and palladium, wherein when the at least one metallic element is copper, the valence of copper is monovalent, wherein a total content of the at least one metallic element is from 1 to 1000 ppm by weight, wherein a total amount of carboxy end groups (total CEG amount) in the liquid crystal polyester is 5.0 mg/kg or less, and wherein the liquid crystal polyester comprises a structural unit derived from 4-hydroxybenzoic acid at a proportion of 50 mol % or more.

* * * * *